(12) United States Patent
Yurchenko et al.

(10) Patent No.: US 8,290,137 B2
(45) Date of Patent: Oct. 16, 2012

(54) SYSTEM AND METHOD FOR USING EXCEPTION ROUTING TABLES IN AN INTERNET BASED TELEPHONE CALL ROUTING SYSTEM

(75) Inventors: Vitaliy G. Yurchenko, Newton, MA (US); Lizhong Zhang, Newton, MA (US)

(73) Assignee: Ibasis, Inc., Burlington, MA (US)

( * ) Notice: Subject to any disclaimer, the term of this patent is extended or adjusted under 35 U.S.C. 154(b) by 906 days.

(21) Appl. No.: 12/357,709

(22) Filed: Jan. 22, 2009

(65) Prior Publication Data

US 2009/0129374 A1 May 21, 2009

Related U.S. Application Data

(63) Continuation-in-part of application No. 10/646,687, filed on Aug. 25, 2003, now Pat. No. 7,577,131, which is a continuation-in-part of application No. 10/298,208, filed on Nov. 18, 2002, now Pat. No. 7,529,225.

(60) Provisional application No. 60/331,479, filed on Nov. 16, 2001.

(51) Int. Cl.
*H04M 7/00* (2006.01)
*H04L 12/66* (2006.01)

(52) U.S. Cl. ............. 379/221.01; 379/219; 379/220.01; 379/221.14; 370/352

(58) Field of Classification Search .................. 379/221, 379/221.01, 219, 220.01, 221.14, 142.01, 379/207.15; 455/558; 370/352
See application file for complete search history.

(56) References Cited

U.S. PATENT DOCUMENTS 7,457,279 B1 * 11/2008 Scott et al. .................... 370/352
7,912,504 B2 * 3/2011 Bjorkner ....................... 455/558

* cited by examiner

*Primary Examiner* — Thjuan K Addy
(74) *Attorney, Agent, or Firm* — Nixon & Vanderhye P.C.

(57) ABSTRACT

In a Voice Over Internet Protocol (VoIP) system for completing telephone calls over the Internet, the system uses a general routing table and client exception routing tables to instruct originating gateways about how to complete calls. When a call request for a particular client is received, the system first looks to that client's exception routing table to see if routing information for the call is available. If so, the system will use the routing information in the client's exception routing table to complete the call. The routing information in the client's exception routing table could include information about preferred destination gateways and/or preferred Internet Service Providers. If the client's exception routing table does not contain information that could be used to route the call, then the system simply uses the routing information in the general routing table. In some situations, the system could utilize multiple general routing tables. Likewise, a single client could have multiple exception routing tables.

22 Claims, 20 Drawing Sheets

GATEWAYS

| | A | B | C | D | E | F | G | H | I | J |
|---|---|---|---|---|---|---|---|---|---|---|
| A | X | 1.3 | 2 | 1.8 | 1 | 2 | 2.2 | 3 | 1.7 | 8 |
| B | 0.9 | X | 3 | 1 | 1.6 | 7 | 1 | X | 1.3 | 2 |
| C | X | 2 | X | 2 | X | 1.7 | 1.8 | 6 | 5 | 5 |
| D | X | X | X | X | X | X | 1.2 | 1.8 | 3 | 2 |
| E | 1.6 | 1.8 | 2 | 3 | X | 7 | 1 | 2.2 | 3 | 1 |
| F | X | 2 | 3 | 1 | 1.1 | X | 1.1 | X | X | X |
| G | 2.2 | 2.2 | 2.8 | 2.1 | 3 | X | X | X | X | X |
| H | 1.4 | 1.3 | 1.1 | 1.4 | 1.2 | 3 | 1 | X | 8 | 8 |
| I | 3.2 | 3.4 | 3.1 | 4 | 4.1 | 4.8 | 3 | 1.2 | X | 3 |
| J | 2.1 | 2.2 | 7 | X | X | X | 3.1 | 8 | 9 | X |

GATEWAYS (row labels)

FIG. 9

GENERAL ROUTING TABLE

| DESTINATION | AVAILABLE DESTINATION GATEWAYS | | | | |
|---|---|---|---|---|---|
| ENGLAND | $GW_{13}$ | $GW_{22}$ | | | |
| FRANCE | $GW_{11}$ | $GW_{33}$ | $GW_{31}$ | $GW_{14}$ | |
| GERMANY | $GW_{51}$ | | | | |
| SPAIN | $GW_{37}$ | $GW_{71}$ | $GW_{40}$ | | |
| ITALY | $GW_{63}$ | $GW_{19}$ | $GW_{51}$ | $GW_{12}$ | $GW_{81}$ |

FIG. 13A

CLIENT 1'S EXCEPTION TABLE

| DESTINATION | PREFERRED DESTINATION GATEWAYS | | | | |
|---|---|---|---|---|---|
| SPAIN | $GW_{40}$ | $GW_{37}$ | $GW_{71}$ | | |
| ITALY | $GW_{51}$ | $GW_{63}$ | $GW_{19}$ | $GW_{12}$ | $GW_{81}$ |

FIG. 13B

CLIENT 2'S EXCEPTION TABLE

| DESTINATION | PREFERRED DESTINATION GATEWAYS | | | | |
|---|---|---|---|---|---|
| FRANCE | $GW_{14}$ | $GW_{11}$ | $GW_{33}$ | | |

FIG. 13C

GENERAL ROUTING TABLE

| DIAL PATTERN | DESTINATION GATEWAYS | | | | | |
|---|---|---|---|---|---|---|
| 7033 | GW | GW | GW | GW | | |
| 703345 | GW | GW | | | | |
| 70335 | GW | GW | | | | |
| 7034 | GW | GW | GW | | | |
| 703416 | GW | | | | | |
| 70342 | GW | GW | | | | |
| 7035 | GW | GW | GW | | | |
| 70355 | GW | GW | | | | |
| 70357 | GW | | | | | |
| 70359 | GW | | | | | |
| 7036 | GW | GW | GW | | | |
| 30766 | GW | GW | | | | |
| 70367 | GW | | | | | |
| 7037 | GW | GW | | | | |

FIG. 15

DESTINATION LOCATIONS

| | | 1 | 2 | 3 | 4 | 5 | 6 | 7 | 8 |
|---|---|---|---|---|---|---|---|---|---|
| O R I G I N A T I N G   G A T E W A Y S | A | X | $R_{A2}$ | $R_{A3}$ | $R_{A4}$ | $R_{A5}$ | $R_{A6}$ | $R_{A7}$ | $R_{A8}$ |
| | B | $R_{B1}$ | $R_{B2}$ | $R_{B3}$ | X | $R_{B5}$ | $R_{B6}$ | $R_{B7}$ | $R_{B8}$ |
| | C | $R_{C1}$ | X | $R_{C3}$ | $R_{C4}$ | $R_{C5}$ | $R_{C6}$ | $R_{C7}$ | $R_{C8}$ |
| | D | $R_{D1}$ | $R_{D2}$ | X | $R_{D4}$ | X | $R_{D6}$ | $R_{D7}$ | $R_{D8}$ |
| | E | $R_{E1}$ | $R_{E2}$ | X | $R_{E4}$ | $R_{E5}$ | $R_{E6}$ | $R_{E7}$ | $R_{E8}$ |
| | F | $R_{F1}$ | $R_{F2}$ | $R_{F3}$ | $R_{F4}$ | $R_{F5}$ | $R_{F6}$ | X | $R_{F8}$ |
| | G | $R_{G1}$ | $R_{G2}$ | $R_{G3}$ | $R_{G4}$ | $R_{G5}$ | $R_{G6}$ | $R_{G7}$ | X |
| | H | $R_{H1}$ | $R_{H2}$ | $R_{H3}$ | $R_{H4}$ | $R_{H5}$ | X | $R_{H7}$ | $R_{H8}$ |

FIG. 18

DESTINATION LOCATIONS

| | | 1 | 5 |
|---|---|---|---|
| O R I G I N A T I N G   G A T E W A Y S | A | X | $R_{A5}$ |
| | B | $R_{B1}$ | $R_{B5}$ |
| | C | $R_{C1}$ | X |
| | D | $R_{D1}$ | $R_{D5}$ |
| | E | $R_{E1}$ | $R_{E5}$ |
| | F | $R_{F1}$ | $R_{F5}$ |
| | G | $R_{G1}$ | $R_{G5}$ |
| | H | $R_{H1}$ | $R_{H5}$ |

FIG. 19

DESTINATION LOCATIONS

| | | 1 | 2 | 3 | 4 | 5 | 6 | 7 | 8 |
|---|---|---|---|---|---|---|---|---|---|
| ORIGINATING GATEWAYS | B | $R_{B1}$ | X | $R_{B3}$ | $R_{B4}$ | $R_{B5}$ | $R_{B6}$ | $R_{B7}$ | $R_{B8}$ |
| | F | $R_{F1}$ | $R_{F2}$ | $R_{F3}$ | $R_{F4}$ | X | $R_{F6}$ | $R_{F7}$ | $R_{F8}$ |
| | G | $R_{G1}$ | $R_{G2}$ | $R_{G3}$ | X | $R_{G5}$ | $R_{G6}$ | $R_{G7}$ | $R_{G8}$ |

FIG. 20

SYSTEM AND METHOD FOR USING EXCEPTION ROUTING TABLES IN AN INTERNET BASED TELEPHONE CALL ROUTING SYSTEM

This application is a continuation-in-part of U.S. application Ser. No. 10/646,687 filed Aug. 25, 2003 now U.S. Pat. No. 7,577,131 which is a Continuation-In-Part of U.S. Application Ser. No. 10/298,208, filed Nov. 18, 2002, now U.S. Pat. No. 7,529,225 the disclosure of both of which is hereby incorporated by reference. The application also claims priority to U.S. Provisional Patent Application Ser. No. 60/331,479, filed Nov. 16, 2001, and U.S. Utility application Ser. No. 10/094,671, filed Mar. 7, 2002, the disclosure of both of which are hereby incorporated by reference.

BACKGROUND OF THE INVENTION

1. Field of the Invention

The invention relates generally to the field of communications, and more specifically to a network configured for Voice over Internet Protocol (VoIP) and/or Facsimile over Internet Protocol (FoIP).

2. Background of the Related Art

Historically, most wired voice communications were carried over the Public Switched Telephone Network (PSTN), which relies on switches to establish a dedicated circuit between a source and a destination to carry an analog or digital voice signal. In the case of a digital voice signal, the digital data is essentially a constant stream of digital data. More recently, Voice over Internet Protocol (VoIP) was developed as a means for enabling speech communication using digital, packet-based, Internet Protocol (IP) networks such as the Internet. A principle advantage of IP is its efficient bandwidth utilization. VoIP may also be advantageous where it is beneficial to carry related voice and data communications over the same channel, to bypass tolls associated with the PSTN, to interface communications originating with Plain Old Telephone Service (POTS) with applications on the Internet, or for other reasons. As discussed in this specification, the problems and solutions related to VoIP may also apply to Facsimile over Internet Protocol (FoIP).

Throughout the description that follows there are references to analog calls over the PSTN. This phrase could refer to analog or digital data streams that carry telephone calls through the PSTN. This is distinguished from VoIP or FoIP format calls, which are formatted as digital data packets.

FIG. 1 is a schematic diagram of a representative architecture in the related art for VoIP communications between originating telephone 100 and destination telephone 145. In alternative embodiments, there may be multiple instances of each feature or component shown in FIG. 1. For example, there may be multiple gateways 125 controlled by a single controller 120. There may also be multiple controllers 120 and multiple PSTN's 115. Hardware and software components for the features shown in FIG. 1 are well-known. For example, controllers 120 and 160 may be Cisco SC2200 nodes, and gateways 125 and 135 may be Cisco AS5300 voice gateways.

To initiate a VoIP session, a user lifts a handset from the hook of originating telephone 100. A dial tone is returned to the originating telephone 100 via Private Branch Exchange (PBX) 110. The user dials a telephone number, which causes the PSTN 115 to switch the call to the originating gateway 125, and additionally communicates a destination for the call to the originating gateway 125. The gateway will determine which destination gateway a call should be sent to using a look-up table resident within the gateway 125, or it may consult the controller 120 for this information.

In related art systems, a general routing table is used to determine how a call should be routed. In practice, when a call request is received, the system consults the general routing table to obtain routing information that will be used to complete the call. The routing information could include the identity of one or more destination gateways that could be used to complete the call, and possibly preferred Internet Service Providers that should be used to complete the call. The originating gateway then tries to complete the call using the routing information from the general routing table.

In the related art systems, the same general routing table is used to route calls for all clients. However, in some instances, a particular client might want to try to route their calls through preferred destination gateways or preferred Internet Service Providers (ISPs). This could happen if the client has a financial interest in the company that owns and runs certain destination gateways and/or ISPs. One way to accommodate this client preference is to set up a separate routing table for each client that places calls through the system. The routing table for each client would list that client's preferred destination gateways and ISPs ahead of the other gateways and ISPs so that the system first attempts to complete calls using the client's preferred routes. However, creating and maintaining a full separate routing table for each client is time consuming, and it consumes system resources.

Once the originating gateway knows which destination gateway to use, the originating gateway then attempts to establish a call with the destination telephone 145 via the VoIP network 130, the destination gateway 135, signaling lines 155 and the PSTN 140. If the destination gateway and PSTN are capable of completing the call, the destination telephone 145 will ring. When a user at the destination telephone 145 lifts a handset and says "hello?" a first analog voice signal is transferred through the PSTN 140 to the destination gateway 135 via lines 155. The destination gateway 135 converts the first analog voice signal originating at the destination telephone 145 into packetized digital data (not shown) and appends a destination header to each data packet. The digital data packets may take different routes through the VoIP network 130 before arriving at the originating gateway 125. The originating gateway 125 assembles the packets in the correct order, converts the digital data to a second analog voice signal (which should be a "hello?" substantially similar to the first analog signal), and forwards the second analog voice signal to the originating telephone 100 via lines 155, PSTN 115 and PBX 110. A user at the originating telephone 100 can speak to a user at the destination telephone 145 in a similar manner. The call is terminated when the handset of either the originating telephone 100 or destination telephone 145 is placed on the hook of the respective telephone. In the operational example described above, the telephone 105 is not used.

In the related art, the controllers 120 and 160 may provide signaling control in the PSTN and a limited means of controlling a gateway at one end of the call. It will be appreciated by those skilled in the art that, in some configurations, all or part of the function of the controllers 120 and 160 as described above may be embedded into the gateways 125 and 135, respectively.

It is necessary to track each individual call that is placed to generate billing and payment information. The billing system must be capable of providing lists that identify, for each call, the calling party, the called party, the duration of the call, and the time of day the call was placed. The call information is then combined with rate information to determine how much should be charged for each call, and how much the system should pay to other service providers for completing calls to called parties Prior art systems typically track information about each call to support the billing process. The tracked information is then complied at the end of each week or each day to determine who owes what for each call. This batch processing is time/resource consuming, and necessarily involves a delay between the time that calls are completed, and the time that bills are generated and sent. Also, because the call information is batch processed at the end of each week/day, there will be a delay before users even know what they owe for placed calls.

SUMMARY OF THE INVENTION

An object of the invention is to solve at least one or more of the above problems and/or disadvantages in whole or in part and to provide at least the advantages described hereinafter.

In a system and method embodying the invention, client preferences about using particular destination gateways and/or ISPs are accommodated without the need to create and maintain a complete separate routing table for each client. In systems and methods embodying the invention, exception routing tables are created for each client, and these exception routing tables contain the information needed to accommodate client preferences for using particular destination gateways and/or ISPs. A single exception routing table only lists routing information that pertains to a sub-set of all the known available destination gateways and/or ISPs.

An exception routing table may be specific to only a single client, or multiple clients may share the same exception routing table. In addition, a single client could have only one exception routing table, or a single client could have multiple exception routing tables. For instance, one client might have a first exception routing table for use on calls that require a high call quality, and a second exception routing table for calls that are to be completed for the lowest possible cost.

In practice, each client will usually only have a short list of preferred destination gateways and ISPs that it would like to use. Thus, the exception routing tables tend to be relatively small tables. Certainly, an exception routing table for a client would be much smaller than a full routing table containing the client's few exceptions. Thus, it is easier and faster to generate and maintain the client exception routing table, as compared to generating and maintaining a full separate routing table for each client. For these reasons, the use of exception routing tables conserves system resources.

When a call request comes in from a client, the system will first check to see if the client has one or more exception routing tables. If not, then the standard routing table is used. If there is an exception routing table for the client, the system looks to see if the exception routing table(s) includes routing information for completing the call to the destination telephone number. If not, the system would again use the standard routing table.

If a check of the client's exception routing table(s) reveals that the exception routing table(s) contains routing information for the destination telephone number, then several different things could happen. In the system has been instructed to use a non-best match approach (which is discussed in more detail in the description which follows) the system would use the information contained in the client's exception routing table to route the call. And if the client has multiple exception routing tables, it might be appropriate to use only one of the client's exception routing tables, or the system might consult each of the client's exception routing tables according to a predetermined sequence in an attempt to route the call. If none of the routes provided in the client's exception routing tables are successful in completing the call, then the system would default to the standard routing table.

In other instances, where the system has been instructed to use a "best-match" approach (which is also discussed in greater detail in the description which follows), the system would look at the entries in the clients exception routing tables, and at the entries in the standard routing table. The entry having the "best match" to the destination telephone number would then be used to attempt to complete the call. If the call cannot be completed using that information, then the routing information for the entry having the next-best match, from the client's exception routing tables and the standard routing table, would then be used to try to complete the call.

Of course, many variations on this basic theme are used to ensure that the calls are completed via routes that provide the required minimum level of call quality, and for the lowest possible cost. Thus, many variations and additional complex steps may be followed by a system to actually route a call to the destination telephone number. But the core of the idea disclosed in this application, is that it is possible to take into account client routing preferences through the use of client exception routing tables, wherein the exception routing tables are much smaller than a full standard routing table.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 9 is a diagram of a matrix illustrating a method for organizing quality of service data for communications paths between gateways;

FIG. 13A illustrates a general routing table that can be used by a system and method embodying the invention;

FIG. 13B illustrates a first client exception routing table that can be used by a system and method embodying the invention;

FIG. 13C illustrates a second client exception routing table that can be used by a system and method embodying the invention;

FIG. 15 illustrates another general routing table that can be used by a system and method embodying the invention;

FIG. 18 illustrates a more complex type of routing table;

FIG. 19 illustrates another type of client exception routing table; and

FIG. 20 illustrates yet another type of client exception routing table.

DETAILED DESCRIPTION OF PREFERRED EMBODIMENTS

Figure 1:
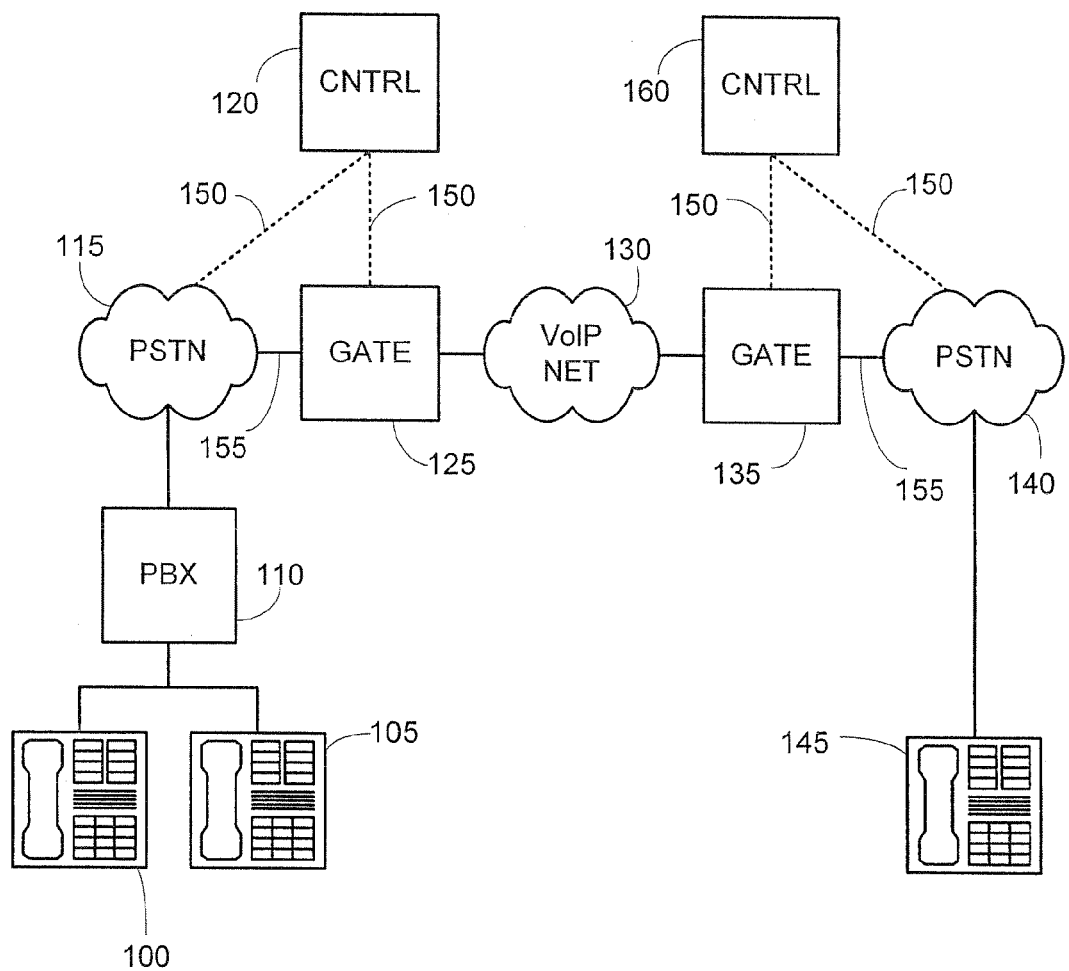
FIG. 1 is a schematic diagram of a system architecture providing VoIP communications, according to the background.
Figure 2:
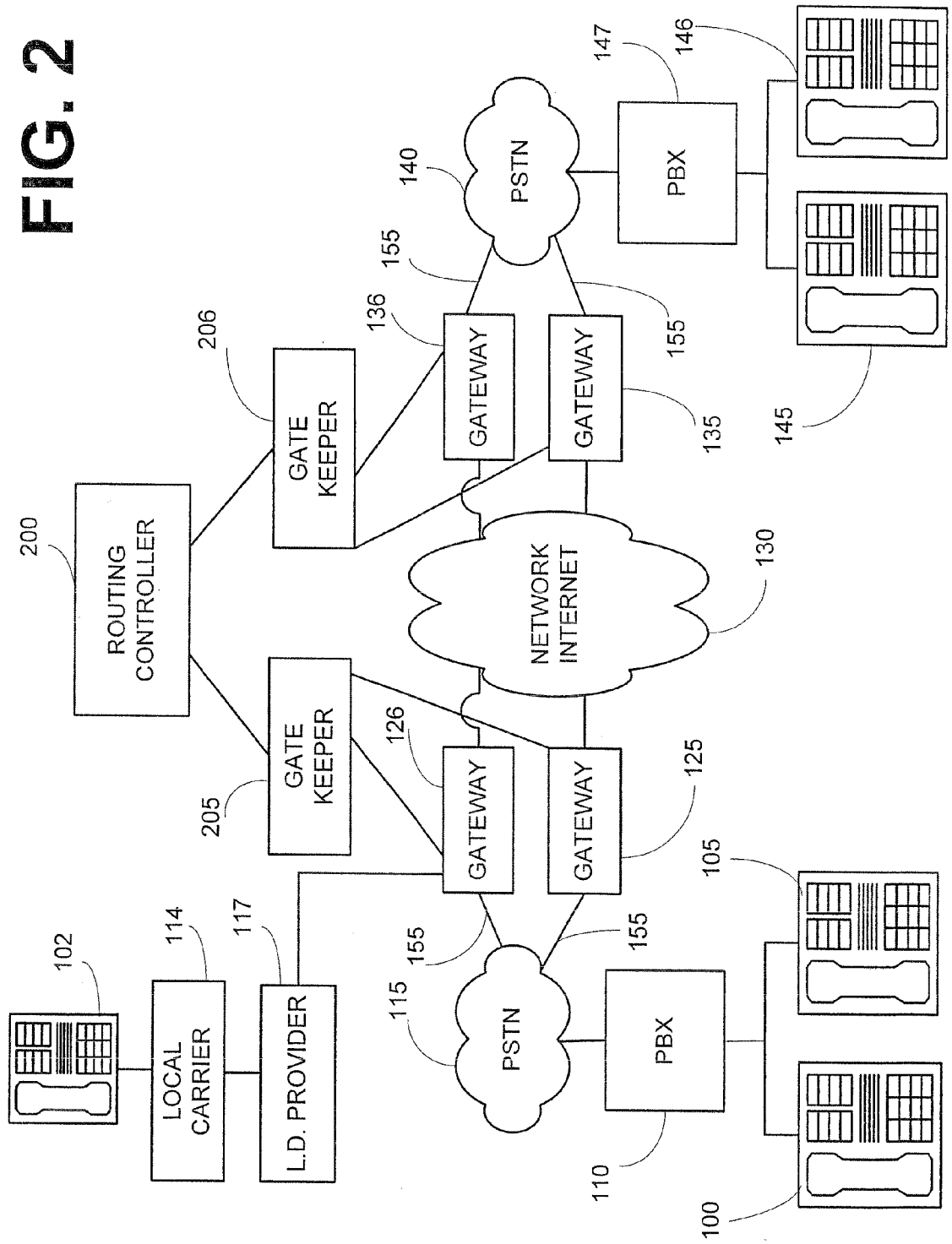
FIG. 2 is a schematic diagram of a system architecture providing VoIP/FoIP communications, according to a preferred embodiment of the invention.

A system embodying the invention is depicted in FIG. 2. The system includes telephones 100/105 connected to a private branch exchange (PBX) 110. The PBX, in turn, is connected to the PSTN 115. In addition, telephones 402 may be coupled to a local carrier 414, which in turn routes long distance calls to one or more long distance service providers 117. Those skilled in the art will recognize that calls could also originate from cellular telephones, computer based telephones, and/or other sources, and that those calls could also be routed through various carriers and service providers. Regardless of where the calls are originating from, they are ultimately forwarded to an originating gateway 125/126.

The originating gateways 125/126 function to convert an analog call into digital packets, which are then sent via the Internet 130 to a destination gateway 135/136. In some instances, the gateways may receive a call that has already been converted into a digital data packet format. In this case, the gateways will function to communicate the received data packets to the proper destination gateways. However, the gateways may modify the received data packets to include certain routing and other formatting information before sending the packets on to the destination gateways.

The gateways 125/126/135/136 are coupled to one or more gatekeepers 205/206. The gatekeepers 205/206 are coupled to a routing controller 200. Routing information used to inform the gateways about where packets should be sent originates at the routing controller.

One of skill in the art will appreciate that although a single routing controller 200 is depicted in FIG. 2, a system embodying the invention could include multiple routing controllers 200. In addition, one routing controller may be actively used by gatekeepers and gateways to provide routing information, while another redundant routing controller may be kept active, but unused, so that the redundant routing controller can step in should the primary routing controller experience a failure. As will also be appreciated by those skilled in the art, it may be advantageous for the primary and redundant routing controllers to be located at different physical locations so that local conditions affecting the primary controller are not likely to also result in failure of the redundant routing controller.

In a preferred embodiment of the invention, as depicted in FIG. 2, the digital computer network 130 used to communicate digital data packets between gateways may be compliant with the H.323 recommendation from the International Telecommunications Union (ITU). Use of H.323 may be advantageous for reasons of interoperability between sending and receiving points, because compliance with H.323 is not necessarily tied to any particular network, platform, or application, because H.323 allows for management of bandwidth, and for other reasons. Thus, in a preferred embodiment, one function of the originating gateways 125 and 126 and the terminating gateways 135 and 136 may be to provide a translation of data between the PSTN=s 115/135 and the H.323-based VoIP network 130. Moreover, because H.323 is a framework document, the ITU H.225 protocol may be used for communication and signaling between the gateways 125/126 and 135/136, and the IETF RTP protocol may be used for audio data between the gateways 125/126 and 135/136, and RAS (Registration, Admission, and Status) protocol may be used in communications with the gatekeepers 205/206.

According to the invention, the gatekeeper 205 may perform admission control, address translation, call signaling, call management, or other functions to enable the communication of voice and facsimile traffic over the PSTN networks 115/140 and the VoIP network 130. The ability to provide signaling for networks using Signaling System No. 7 (SS7) and other signaling types may be advantageous over network schemes that rely on gateways with significantly less capability. For example, related art gateways not linked to the gatekeepers of the present invention may only provide signaling for Multi-Frequency (MF), Integrated Services Digital Network (ISDN), or Dual Tone Multi-Frequency (DTMF).

According to a preferred embodiment of the present invention, the gatekeeper 205 may further provide an interface between different gateways, and the routing controller 200. The gatekeeper 205 may transmit routing requests to the routing controller 200, receive an optimized route from the routing controller 200, and execute the route accordingly.

Persons skilled in the art of communications will recognize that gatekeepers may also communicate with other gatekeepers to manage calls outside of the originating gatekeepers area of control. Additionally, it may be advantageous to have multiple gatekeepers linking a particular gateway with a particular routing controller so that the gatekeepers may be used as alternates, allowing calls to continue to be placed to all available gateways in the event of failure of a single gatekeeper. Moreover, although the gatekeeping function may be logically separated from the gateway function, embodiments where the gatekeeping and gateway functions are combined onto a common physical host are also within the scope of the invention.

In a system embodying the present invention, as shown in FIG. 2, a routing controller 200 is logically coupled to gateways 125/126 and 135/136 through gatekeepers 205/206. The routing controller 200 contains features not included in the prior art signaling controllers 120 and 160 of the prior art systems described above, as will be described below. Routing controller 200 and gatekeepers 205/206 may be hosted on one or more network-based servers which may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, Open- Step™, Java Virtual Machine or other operating system or platform. Detailed descriptions of the functional portions of a typical routing controller embodying the invention is provided below.

Figure 3:
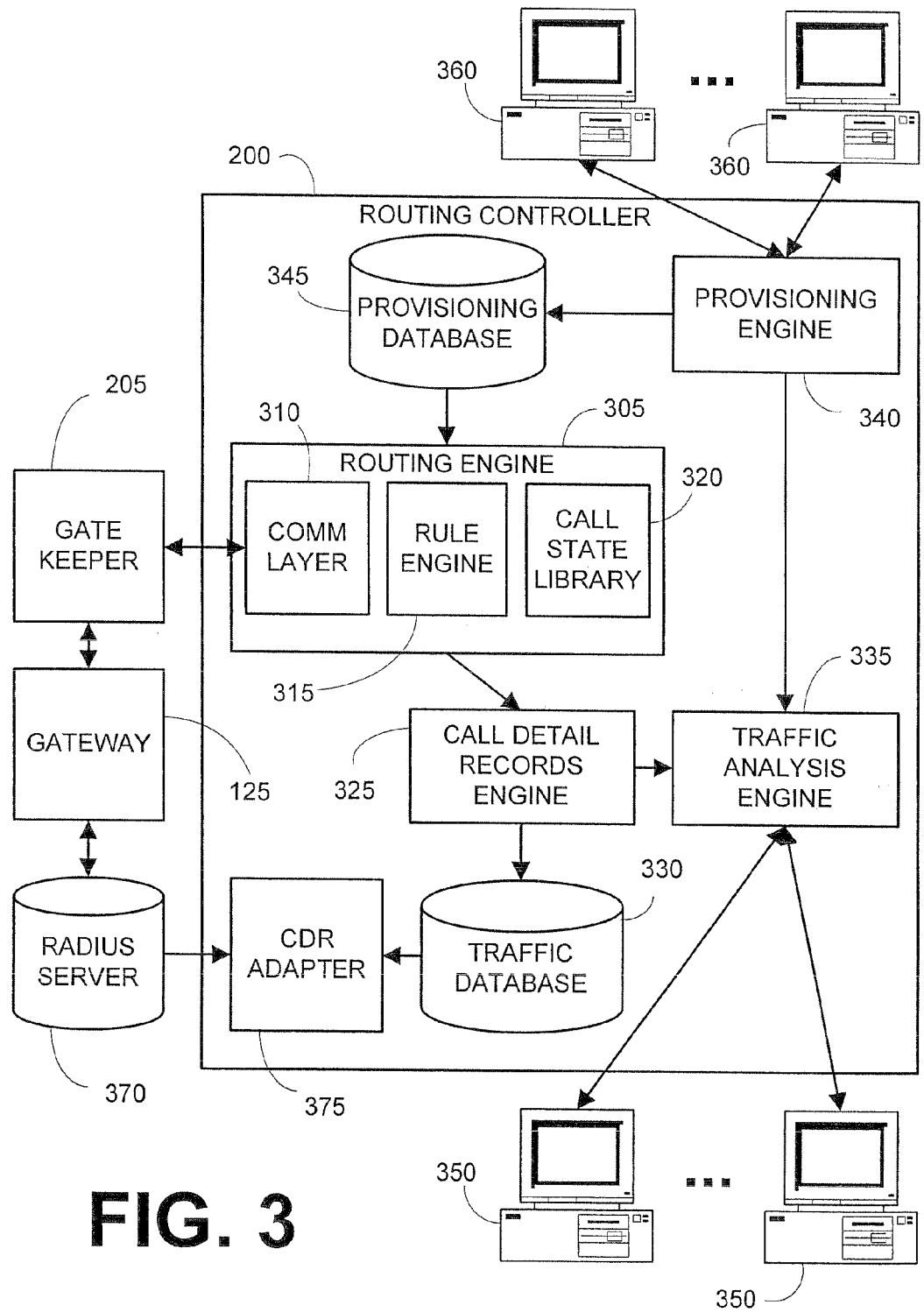
FIG. 3 is a schematic diagram of a system architecture providing improved control for VoIP communications, according to a preferred embodiment of the invention.

As indicated in FIG. 3, a routing controller 200 may include a routing engine 305, a Call Detail Record (CDR) engine 325, a traffic database 330, a traffic analysis engine 335, a provisioning engine 340, and a provisioning database 345. The routing engine 305, CDR engine 325, traffic analysis engine 335, and provisioning engine 340 may exist as independent processes and may communicate to each other through standard interprocess communication mechanisms. They might also exist on independent hosts and communicate via standard network communications mechanisms.

In alternative embodiments, the routing engine 305, Call Detail Record (CDR) engine 325, traffic database 330, traffic analysis engine 335, provisioning engine 340, or provisioning database 345 may be duplicated to provide redundancy. For instance, two CDR engines 325 may function in a master-slave relationship to manage the generation of billing data.

The routing engine 305 may include a communications layer 310 to facilitate an interface between the routing engine 305 and the gatekeepers 205/206. Upon receipt of a routing request from a gatekeeper, the routing engine 305 may determine the best routes for VoIP traffic based upon one or more predetermined attributes such as the selected carrier service provider, time of day, a desired Quality of Service (QoS), cost, or other factors. The routing information generated by the routing engine 305 could include a destination gateway address, and/or a preferred Internet Service Provider to use to place the call traffic into the Internet. Moreover, in determining the best route, the rule engine 315 may apply one or more exclusionary rules to candidate routes, based upon known bad routes, provisioning data from provisioning database 345, or other data.

The routing engine 305 may receive more than one request to route a single call. For example, when a first routing attempt was declined by the terminating gateway, or otherwise failed to result in a connection, or where a previous routing attempt resulted in a disconnect other than a hang-up by the originator or recipient, then the routing engine may receive a second request to route the same call. To provide redundancy, the routing engine 305 may generate alternative routes to a particular far-end destination. In a preferred embodiment of the invention, when the routing engine receives a routing request, the routing engine will return both preferred routing information, and alternative routing information. In this instance, information for at least one next-best route will be immediately available in the event of failure of the preferred route. In an alternative embodiment, routing engine 305 may determine a next-best route only after the preferred route has failed. An advantage of the latter approach is that routing engine 305 may be able to better determine the next-best route with the benefit of information concerning the most recent failure of the preferred route.

To facilitate alternative routing, and for other reasons, the routing engine 305 may maintain the state of each VoIP call in a call state library 320. For example, routing engine 305 may store the state of a call as "set up," "connected," "disconnected," or some other state.

Routing engine 305 may further format information about a VoIP call such as the originator, recipient, date, time, duration, incoming trunk group, outgoing trunk group, call states, or other information, into a Call Detail Record (CDR). Including the incoming and outgoing trunk group information in a CDR may be advantageous for billing purposes over merely including IP addresses, since IP addresses may change or be hidden, making it difficult to identify owners of far-end network resources. Routing engine 305 may store CDR's in a call state library 320, and may send CDR's to the CDR engine 325 in real time, at the termination of a call, or at other times.

The CDR engine 325 may store CDR's to a traffic database 330. To facilitate storage, the CDR engine 325 may format CDR's as flat files, although other formats may also be used. The CDR's stored in the traffic database 330 may be used to generate bills for network services. The CDR engine 325 may also send CDR's to the traffic analysis engine 335.

Data necessary for the billing of network services may also be stored in a Remote Authentication Dial-In User Service (RADIUS) server 370. In fact, in some embodiments, the data stored in the RADIUS server may be the primary source of billing information. The RADIUS server 370 may also directly communicate with a gateway 125 to receive and store data such as incoming trunk group, call duration, and IP addresses of near-end and far-end destinations. The CDR adapter 375 may read data from both the traffic database 330 and the RADIUS server 370 to create a final CDR. The merged data supports customer billing, advantageously including information which may not be available from RADIUS server 370 alone, or the traffic database 330 alone.

The traffic analysis engine 335 may collect CDR's, and may automatically perform traffic analysis in real time, near real time, or after a predetermined delay. In addition, traffic analysis engine 335 may be used to perform post-traffic analysis upon user inquiry. Automatic or user-prompted analysis may be performed with reference to a predetermined time period, a specified outgoing trunk group, calls that exceed a specified duration, or according to any other variable(s) included in the CDR's.

The provisioning engine 340 may perform tasks necessary to route particular calls over the Internet. For example, the provisioning engine 340 may establish or modify client account information, authorize a long distance call, verify credit, assign phone numbers where the destination resides on a PSTN network, identify available carrier trunk groups, generate routing tables, or perform other tasks. In one embodiment of the invention, provisioning may be performed automatically. In another embodiment, provisioning may be performed with user input. Hybrid provisioning, that is, a combination of automated and manual provisioning, may also be performed. The provisioning engine 340 may further cause provisioning data to be stored in a provisioning database 345.

Client workstations 350 and 360 may be coupled to routing controller 200 to provide a user interface. As depicted in FIG. 3, the client(s) 350 may interface to the traffic analysis engine 335 to allow a user to monitor network traffic. The client(s) may interface to the provisioning engine 340 to allow a user to view or edit provisioning parameters. In alternative embodiments, a client may be adapted to interface to both the traffic analysis engine 335 and provisioning engine 340, or to interface with other features of routing controller 200.

In a system embodying the invention, as shown in FIG. 2, the gateways 125/126 would first receive a request to set up a telephone call from the PSTN, or from a Long Distance Provider 117, or from some other source. The request for setting up the telephone call would typically include the destination telephone number. In order to determine which destination gateway should receive the packets, the gateway would consult the gatekeeper 205.

The gatekeeper 205, in turn may consult the routing controller 200 to determine the most appropriate destination gateway. In some situations, the gatekeeper may already have the relevant routing information. In any event, the gatekeeper would forward the routing information to the originating gateway 125/126, and the originating gateway would then send the appropriate packets to the appropriate destination gateway. As mentioned previously, the routing information provided by the gatekeeper may include just a preferred destination gateway, or it may include both the preferred destination gateway information, and information on one or more next-best destination gateways. The routing information may also include a preferred route or path onto the Internet, and one or more next-best route. The routing information may further include information about a preferred Internet Service Provider.

Figure 4:
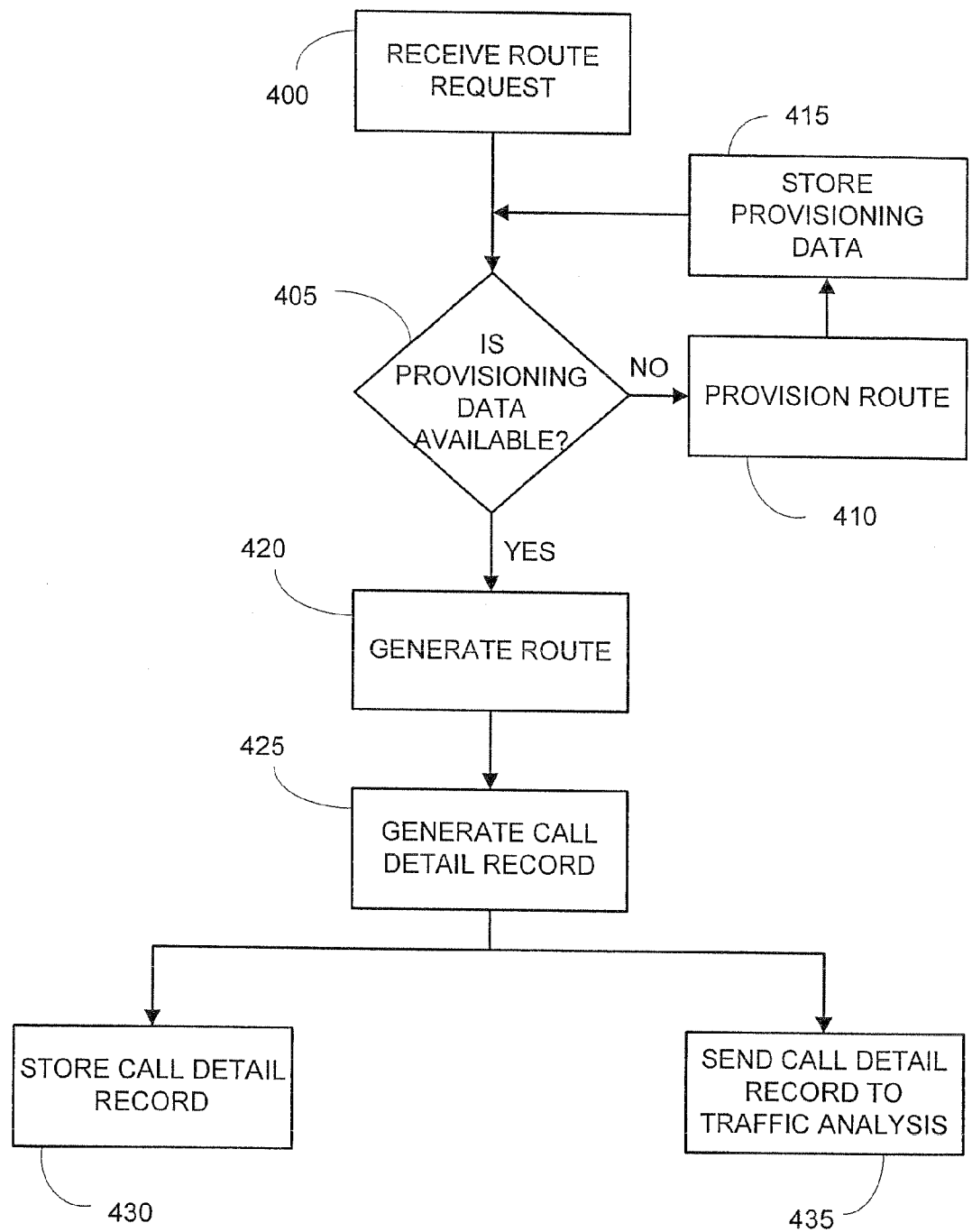
FIG. 4 is a flow diagram illustrating a method for routing control, according to a preferred embodiment of the invention.

FIG. 4 is a flow chart illustrating a method embodying the invention for using the routing controller 200. In step 400, the routing controller 200 receives a routing request from either a gatekeeper, or a gateway. In step 405, a decision is made as to whether provisioning data is available to route the call. If the provisioning data is not available, the process advances to step 410 to provision the route, then to step 415 for storing the provisioning data before returning to decision step 405.

If, on the other hand, if it is determined in step 405 that provisioning data is available, then the process continues to step 420 for generating a route. In a preferred embodiment of the invention, step 420 may result in the generation of information for both a preferred route, and one or more alternative routes. The alternative routes may further be ranked from best to worst.

The routing information for a call could be simply information identifying the destination gateway to which a call should be routed. In other instances, the routing information could include information identify the best Internet Service Provider to use to place the call traffic onto the Internet. In addition, the routing controller may know that attempting to send data packets directly from the originating gateway to the destination gateway is likely to result in a failed call, or poor call quality due to existing conditions on the Internet. In these instances, the routing information may include information that allows the data packets to first be routed from the originating gateway to one or more interim gateways, and then from the interim gateways to the ultimate destination gateway. The interim gateways would simply receive the data packets and immediately forward the data packets on to the ultimate destination gateway.

Step 420 may also include updating the call state library, for example with a call state of "set up" once the route has been generated. Next, a CDR may be generated in step 425. Once a CDR is available, the CDR may be stored in step 430 and sent to the traffic analysis engine in step 435. In one embodiment, steps 430 and 435 may be performed in parallel, as shown in FIG. 4. In alternative embodiments, steps 430 and 435 may be performed sequentially. In yet other embodiments, only step 430 or only step 435 may be performed.

Figure 5:
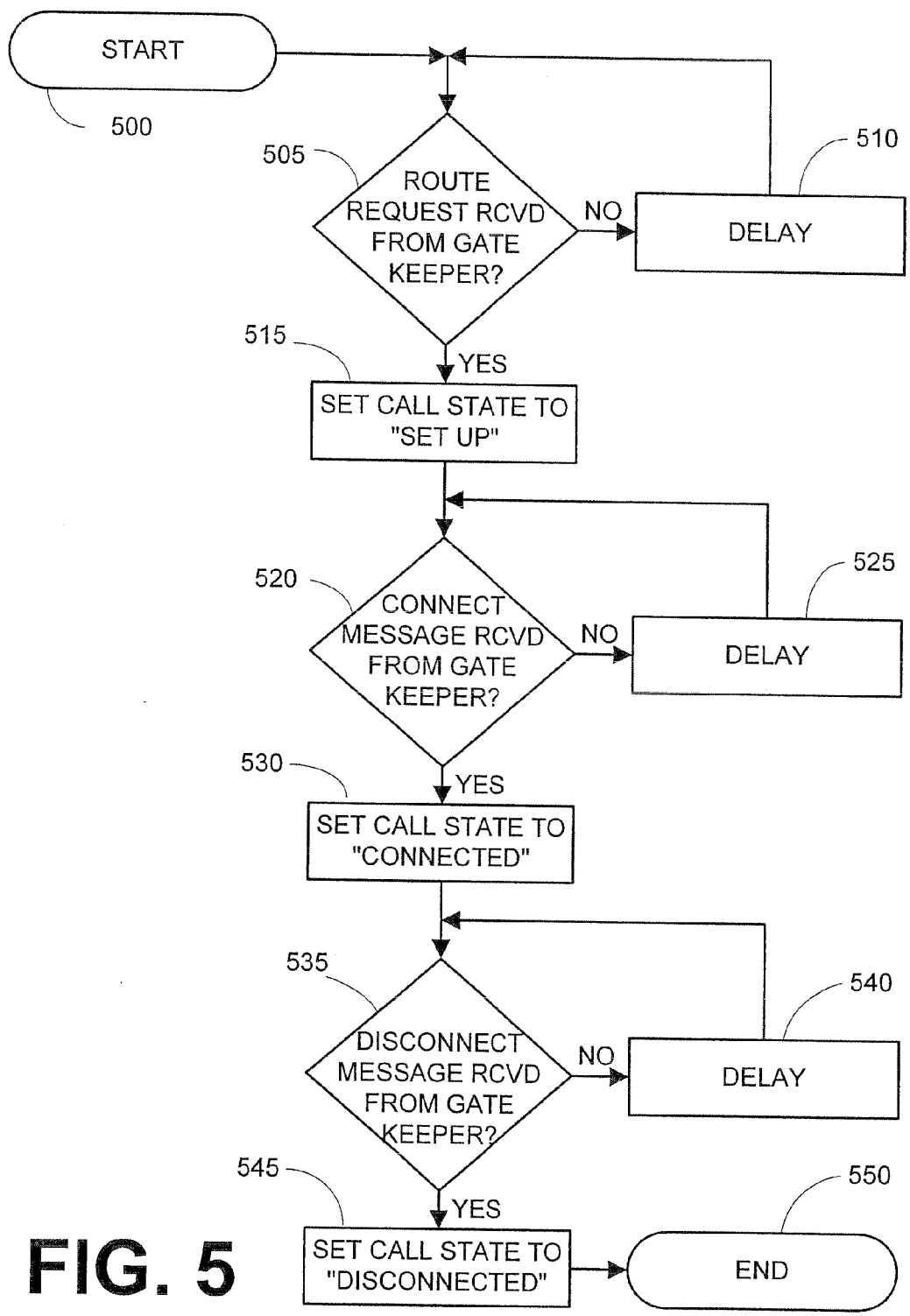
FIG. 5 is a flow diagram illustrating a method for maintaining a call state, according to a preferred embodiment of the invention.

FIG. 5 is a flow diagram illustrating a method for maintaining a call state, which may be performed by routing engine 305. After starting in step 500, the process may determine in step 505 whether a route request has been received from a gatekeeper or other source. If a routing request has not been received, the process may advance to a delay step 510 before returning to decision step 505. If, however, it is determined in step 505 that a route request has been received, then a call state may be set to "set up" in step 515.

The process of FIG. 5 may then determine in step 520 whether a connect message has been received from a gatekeeper or other source. If a connect message has not been received, the process may advance to delay step 525 before returning to decision step 520. If, however, it is determined in step 520 that a connect message has been received, then a call state may be set to "connected" in step 530.

The process of FIG. 5 may then determine in step 535 whether a disconnect message has been received from a gate keeper or other source. If a disconnect message has not been received, the process may advance to delay step 540 before returning to decision step 535. If, however, it is determined in step 535 that a disconnect message has been received, then a call state may be set to "disconnected" in step 545 before the process ends in step 550.

The process depicted in FIG. 5 will operate to keep the call state for all existing calls up to date to within predetermined delay limits. In alternative embodiments of the invention, the call state monitoring process can monitor for other call states such as "hang-up," "busy," or other call states not indicated above. Moreover, monitoring for other call states may be instead of, or in addition to, those discussed above. Further, in one embodiment, monitoring could be performed in parallel, instead of the serial method illustrated in FIG. 5.

Figure 6:
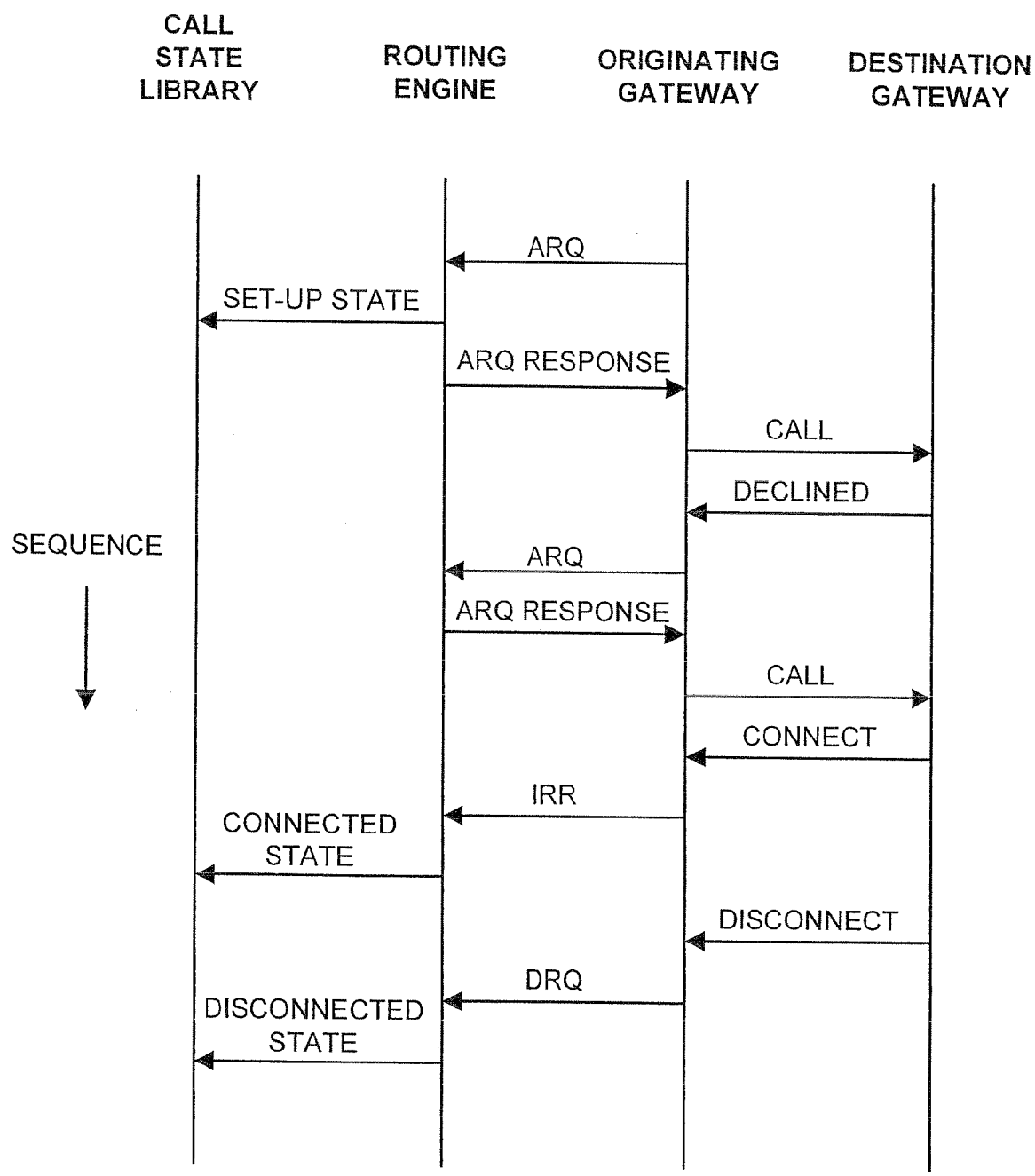
FIG. 6 is a sequence diagram illustrating a method for communicating between functional nodes of a VoIP network, according to a preferred embodiment of the invention.

FIG. 6 discloses a sequence of messages between an originating gateway, a routing engine, a call state library, and a destination gateway, according to a preferred embodiment of the invention. In operation of the network, the originating gateway may send a first request for routing information, in the form of a first Admission Request (ARQ) message, to a routing engine within a routing controller. The request would probably be passed on through a gatekeeper logically positioned between the gateway and the routing engine in the routing controller.

Upon receipt of the routing request, the routing engine may store a set-up state in call state library. The routing engine may then determine a best route based upon one or more predetermined attributes such as the selected carrier service provider, a desired Quality of Service (QoS), cost, or other factors. The routing engine may then send information pertaining to the best route to the originating gateway, possibly via a gatekeeper, as a first ARQ response message. The gateway would then initiate a first call to a destination gateway using the information contained within the response message. As shown in FIG. 6, the destination gateway may return a decline message to the originating gateway.

When the originating gateway receives a decline message, the gateway may send a second request for routing information, in the form of a second ARQ message, to routing engine. Routing engine may recognize the call as being in a set up state, and may determine a next best route for completion of the call. Routing engine may then send a second ARQ response message to the originating gateway. The originating gateway may then send a second call message to the same or a newly selected destination gateway using the next best route. In response to the second call message, the destination gateway may return a connect message to the originating gateway.

The routing engine may use a conference ID feature of the H.323 protocol, which is unique to every call, in order to keep track of successive routing attempts. Thus, upon receiving a first ARQ for a particular call, routing engine may respond with a best route; upon receiving a second ARQ associated with the same call, routing engine may respond with the second best route. If the second call over the next best route does not result in a connection, the originating gateway may send a third ARQ message to routing engine, and so on, until an ARQ response message from routing engine enables a call to be established between the originating gateway and a destination gateway capable of completing the call to the called party.

In alternative embodiments of the invention, the initial ARQ response from the routing engine to the originating gateway may include information about the best route, and one or more next-best routes. In this instance, when a call is declined by one terminating gateway, the originating gateway can simply attempt to route the call using the next-best route without the need to send additional queries to the routing engine.

Once the originating gateway receives a connect message from a destination gateway, the originating gateway may send an Information Request Response (IRR) message to the routing engine to indicate the connect. In response, the routing engine may store a connected state message to the call state library.

After a call is connected, a call may become disconnected. A disconnect may occur because a party has hung up, because of a failure of a network resource, or for other reasons. In this instance, destination gateway may send a disconnect message to the originating gateway. In response, originating gateway may send a Disengage Request (DRQ) message to the routing engine. The routing engine may then update the call state by storing a disconnected state status in the call state library.

Figure 7:
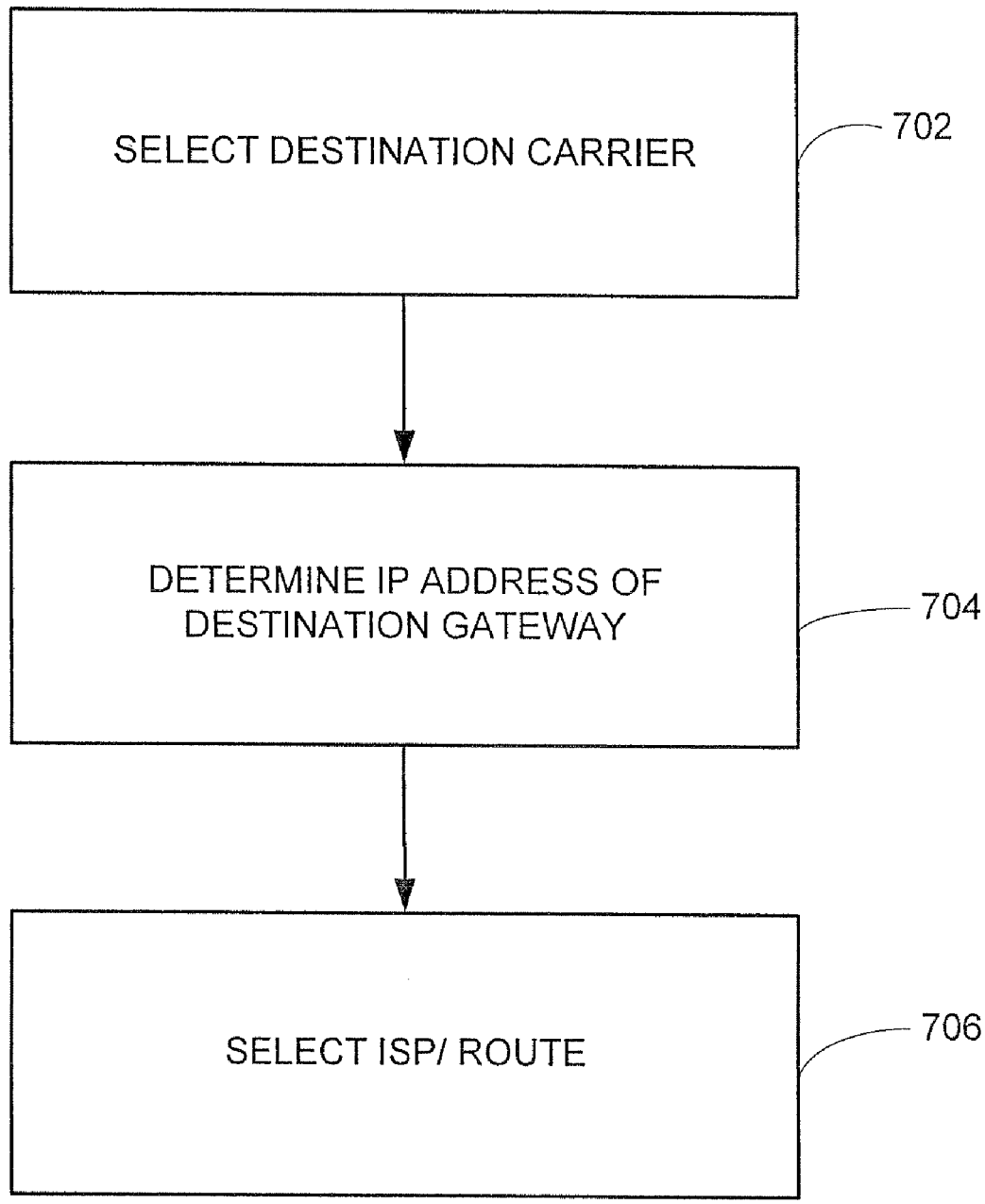
FIG. 7 is a flow diagram illustrating a three level routing method, according to a preferred embodiment of the invention.

FIG. 7 is a flow diagram illustrating a method, according to a preferred embodiment of the invention, for generating routing information in response to a routing request. As shown in FIG. 7, when a routing controller (or a gatekeeper) receives a routing request from a gateway, the method first involves selecting a destination carrier that is capable of completing the call to the destination telephone in step 702. In some instances, there may be only one destination carrier capable of completing the call to the destination telephone. In other instances, multiple destination carriers may be capable of completing the call. In those instances where multiple carriers are capable of completing the call, it is necessary to initially select one destination carrier. If the call is completed on the first attempt, that carrier will be used. If the first attempt to complete the call fails, the same or a different carrier may ultimately be used to complete the call.

Where there are multiple destination carriers capable of completing the call, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between the system operator and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

Once the destination carrier has been selected, the method would include identifying an IP address of a destination gateway connected to the destination carrier and capable of passing the call on to the destination carrier. The destination gateway could be operated by the system operator, or by the destination carrier, or by a third party. Typically, a table would be consulted to determine which destination gateways correspond to which destination carriers and geographic locations.

Often there may be multiple destination gateways capable of completing a call to a particular destination carrier. In this situation, the step of determining the IP address could include determining multiple destination IP addresses, each of which correspond to destination gateways capable of completing the call to the destination carrier. Also, the IP address information may be ranked in a particular order in recognition that some destination gateways may offer more consistent or superior IP quality. Also, if two or more destination gateways capable of completing a call to a destination carrier are operated by different parties, there may be cost considerations that are also used to rank the IP address information. Of course, combinations of these and other considerations could also be used to select particular destination gateways, and to thus determine the IP address(es) to which data packets should be sent.

In some embodiments of the invention, determining the IP address(es) of the terminating gateway(s) may be the end of the process. This would mean that the system operator does not care which Internet Service Provider (ISP) or which route is used to place data traffic onto the Internet. In other instances, the method would include an additional step, step 806, in which the route onto the Internet and/or the ISP would then be selected. The selection of a particular ISP may be based on a quality of service history, the cost of carrying the data, or various other considerations. The quality of service history may take into account packet loss, latency and other IP based considerations. Also, one ISP may be judged superior at certain times of the day/week, while another ISP may be better at other times. As will be described in more detail below, the system has means for determining the quality of service that exists for various routes onto the Internet. This information would be consulted to determine which route/ISP should be used to place call data onto the Internet. Further, as mentioned above, in some instances, the routing information may specify that the call data be sent from the originating gateway to an interim gateway, and then from the interim gateway to the destination gateway. This could occur, for example, when the system knows that data packets placed onto the Internet at the originating gateway and addressed directly to the destination gateway are likely to experience unacceptable delays or packet loss.

In some instances, the quality of service can be the overriding consideration. In other instances, the cost may be the primary consideration. These factors could vary client to client, and call to call for the same client.

For example, the system may be capable of differentiating between customers requiring different call quality levels. Similarly, even for calls from a single customer, the system may be capable of differentiating between some calls that require high call quality, such as facsimile transmissions, and other calls that do not require a high call quality, such as normal voice communications. The needs and desires of customers could be determined by noting where the call originates, or by other means. When the system determines that high call quality is required, the system may eliminate some destination carriers, destination gateways, and ISPs/routes from consideration because they do not provide a sufficiently high call quality. Thus, the system may make routing decisions based on different minimum thresholds that reflect different customer needs.

Figure 8:
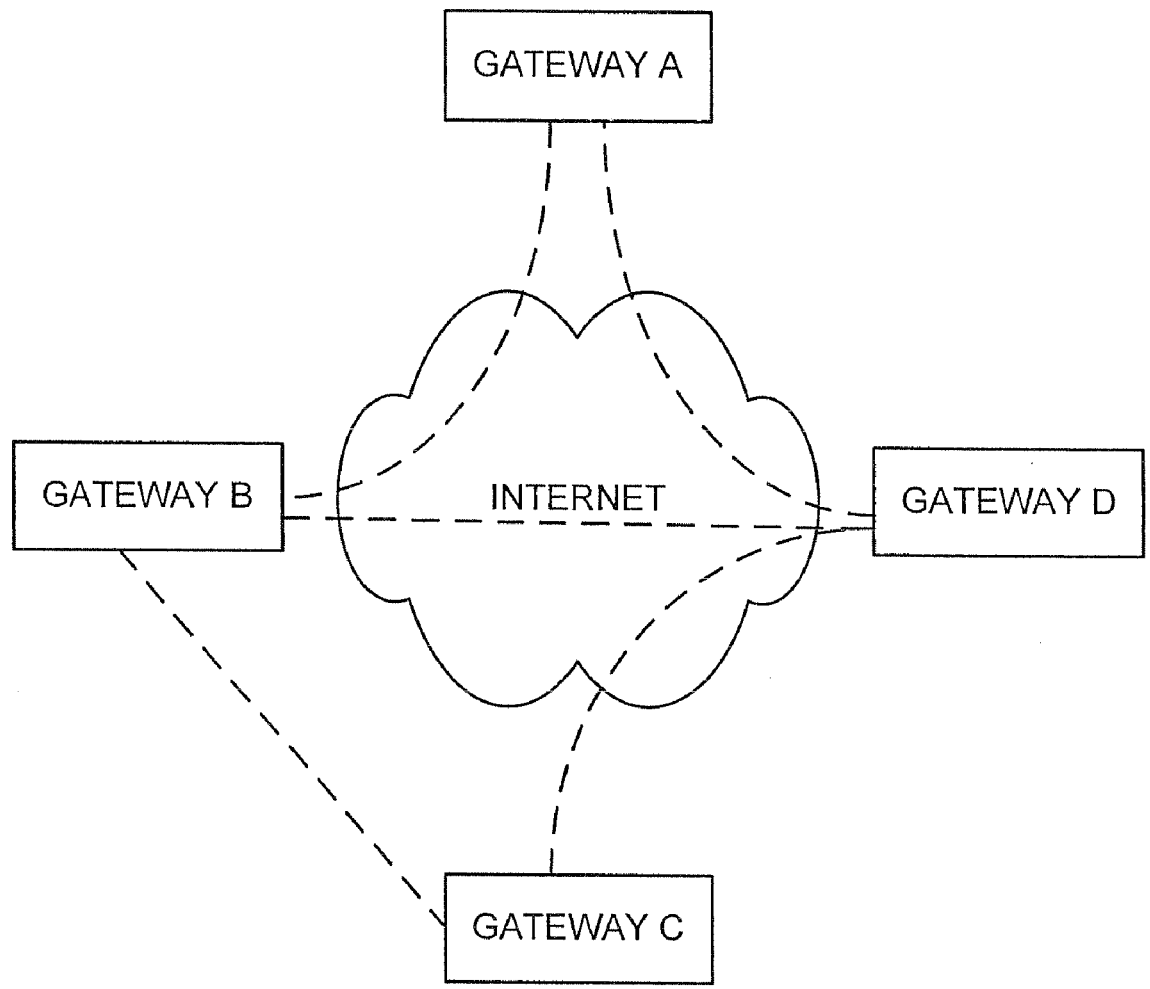
FIG. 8 is a schematic diagram of a system architecture embodying the invention.

FIG. 8 shows a conceptual diagram of four gateways with access to the Internet. Gateway A can reach Gateways B and C via the Internet. Gateway C can reach Gateway D via the Internet, and Gateway B via an external connection. Due to Internet conditions, it will often be the case that certain Gateways, while having access to the Internet, cannot reliably send data packets to other gateways connected to the Internet. Thus, FIG. 8 shows that Gateway C cannot reach Gateways B or A through the Internet. This could be due to inordinately long delays in sending data packets from Gateway C to Gateways A and B, or for other reasons.

The gateways illustrated in FIG. 8 could be gateways controlled by the system operator. Alternatively, some of the gateways could be maintained by a destination carrier, or a third party. As a result, the gateways may or may not be connected to a routing controller through a gatekeeper, as illustrated in FIG. 2. In addition, some gateways may only be capable of receiving data traffic and passing it off to a local or national carrier, while other gateways will be capable of both receiving and originating traffic.

Some conclusions logically flow from the architecture illustrated in FIG. 8. For instance, Gateway B can send data traffic directly to Gateway D through the Internet, or Gateway B could choose to send data to Gateway D by first sending the traffic to Gateway A, and then having Gateway A forward the traffic to Gateway D. In addition, Gateway B could send the traffic to Gateway C via some type of direct connection, and then have Gateway C forward the data on to Gateway D via the Internet.

The decision about how to get data traffic from one gateway to another depends, in part, on the quality of service that exists between the gateways. The methods embodying the invention that are described below explain how one can measure the quality of service between gateways, and then how the quality measurements can be used to make routing decisions.

As is well known in the art, a first gateway can "ping" a second gateway. A "ping" is a packet or stream of packets sent to a specified IP address in expectation of a reply. A ping is normally used to measure network performance between the first gateway and the second gateway. For example, pinging may indicate reliability in terms of a number of packets which have been dropped, duplicated, or re-ordered in response to a pinging sequence. In addition, a round trip time, average round trip time, or other round trip time statistics can provide a measure of system latency.

In some embodiments of the invention, the quality of service measurements may be based on an analysis of the round trip of a ping. In other embodiments, a stream of data packets sent from a first gateway to a second gateway could simply be analyzed at the second gateway. For instance, numbered and time-stamped data packets could be sent to the second gateway, and the second gateway could determine system latency and whether packets were dropped or reordered during transit. This information could then be forwarded to the routing controller so that the information about traffic conditions between the first and second gateways is made available to the first gateway.

A system as illustrated in FIG. 8 can use the data collected through pings to compare the quality and speed of a communication passing directly between a first gateway and a second gateway to the quality and speed of communications that go between the first and second gateways via a third or intermediate gateway. For instance, using the system illustrated in FIG. 8 as an example, the routing controller could hold information about traffic conditions directly between Gateway B and Gateway D, traffic conditions between Gateway B and Gateway A, and traffic conditions between Gateway A and Gateway D. If Gateway B wants to send data packets to Gateway D, the routing controller could compare the latency of the route directly from Gateway B to Gateway D to the combined latency of a route that includes communications from Gateway B to Gateway A and from Gateway A to Gateway D. Due to local traffic conditions, the latency of the path that uses Gateway A as an interim Gateway might still be less than the latency of the direct path from Gateway B to Gateway D, which would make this route superior.

In methods embodying the invention, each gateway capable of directly accessing another gateway via the Internet may periodically ping each of the other gateways. The information collected from the pings is then gathered and analyzed to determine one or more quality of service ratings for the connection between each of the gateways. The quality of service ratings can then be organized into tables, and the tables can be used to predict whether a particular call path is likely to provide a given minimum quality of service.

To reduce the amount of network traffic and the volume of testing, only one gateway within a group of co-located gateways may be designated as a proxy tester for all gateways within the co-located group. In addition, instead of pinging a far-end gateway, one might ping other Internet devices that are physically close to the far-end gateway. These steps save network bandwidth by reducing the required volume of testing. Also, the testing can be delegated to lower cost testing devices, rather than expensive gateways.

A quality of service measure would typically be calculated using the raw data acquired through the pinging process. As is well known to those of skill in the art, there are many different types of data that can be derived from the pinging itself, and there is an almost infinite variety of ways to combine this data to calculate different quality of service measures.

FIG. 9 is a diagram of a matrix of quality of service data that indicates the quality of service measured between 10 different gateways, gateways A-J. This table is prepared by having each of the gateways ping each of the other gateways. The data collected at a first gateway is then collected and used to calculate a quality of rating between the first gateway and each of the other gateways. A similar process of collection and calculation occurs for each of the other gateways in the system. The calculated quality of service values are then inserted into the matrix shown in FIG. 9. For instance, the quality measure value at the intersection of row A and column D is 1.8. Thus, the value of 1.8 represents the quality of service for communications between Gateways A and D. When an X appears in the matrix, it means that no communications between the row and column gateways was possible the last time the pings were collected.

Although only a single value is shown in the matrix illustrated in FIG. 9, multiple quality of service values could be calculated for communications between the various gateways. In other words, multiple values might be stored at each intersection point in the matrix. For instance, pings could be used to calculate the packet loss (PL), latency (LA), and a quality of service value (Q) which is calculated from the collected pinging data. In this instance, each intersection in the matrix would have an entry of "PL, LA, Q". Other combinations of data could also be used in a method and matrix embodying the invention.

The pinging, data collection and calculation of the values shown in the matrix could be done in many different ways. Two alternative methods are illustrated in FIGS. 10A and 10B.

Figure 10:
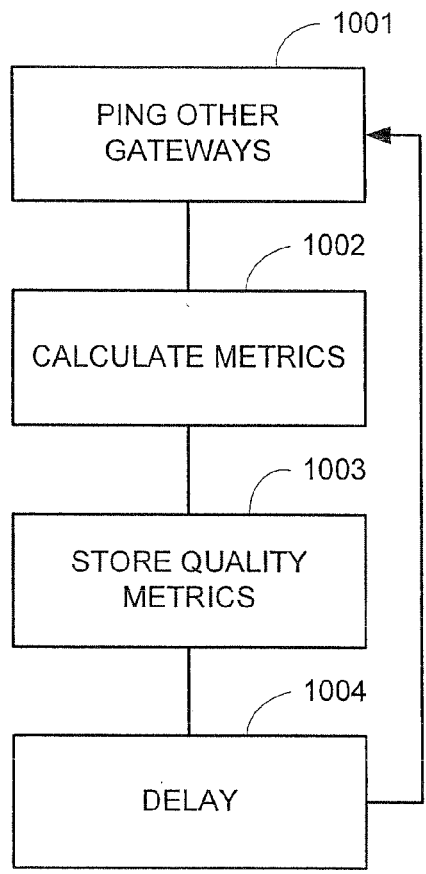
FIGS. 10A and 10B are flow diagrams of alternate methods of obtaining quality of service data for alternate communications paths.
Figure 10:
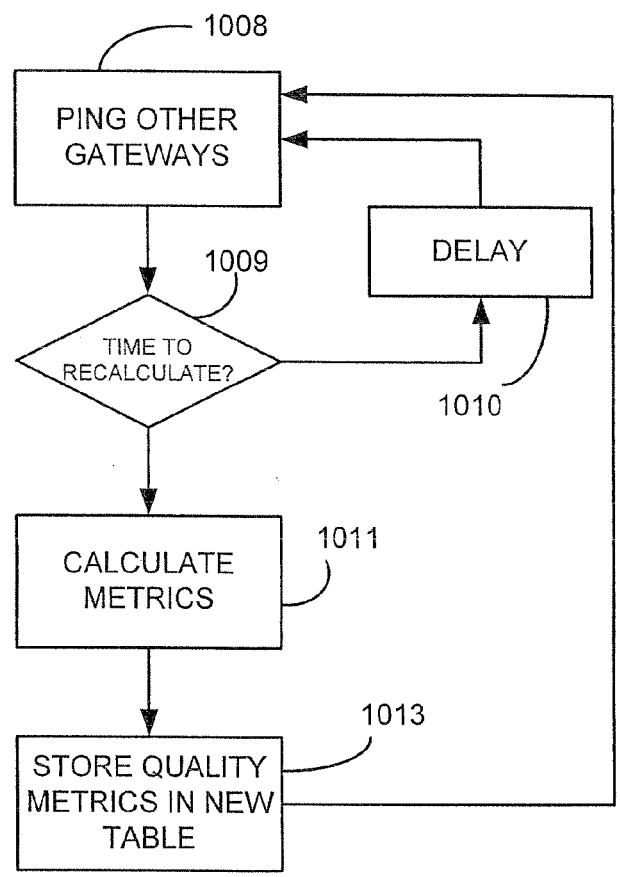

In the method shown in FIG. 10A, pinging occurs in step 1001. As discussed above, this means that each gateway pings the other gateways and the results are recorded. In step 1002, the data collected during the pinging step is analyzed and used to calculate various quality measures. In step 1003, the quality metrics are stored into the matrix. The matrix can then be used, as discussed below, to make routing decisions. In step 1004, the method waits for a predetermined delay period to elapse. After the delay period has elapsed, the method returns to step 1001, and the process repeats.

It is necessary to insert a delay into the method to avoid excessive pinging from occurring. The traffic generated by the pinging process takes up bandwidth that could otherwise be used to carry actual data traffic. Thus, it is necessary to strike a balance between conducting the pinging often enough to obtain accurate information and freeing up the system for actual data traffic. In addition, the bandwidth used by testing can also be managed by controlling the number of pings sent per test. Thus, the consumption of bandwidth is also balanced against the ability to measure packet loss.

The alternate method shown in FIG. 10B begins at step 1008 when the pinging process is conducted. Then, in step 1009, the system determines whether it is time to re-calculate all the quality of service metrics. This presupposes that the matrix will only be updated at specific intervals, rather than each time a pinging process is conducted. If it is not yet time to update the matrix, the method proceeds to step 1010, where a delay period is allowed to elapse. This delay is inserted for the same reasons discussed above. Once the delay period has elapsed, the method returns to step 1008 where the pinging process is repeated.

If the result of step 1009 indicates that it is time to recalculate the quality metrics, the method proceeds to step 1011, where the calculations are performed. The calculated quality metrics are then stored in the matrix in step 1013, and the method returns to step 1008. In this method, the matrix is not updated as frequently, and there is not as high a demand for performing the calculations. This can conserve valuable computer resources. In addition, with a method as illustrated in FIG. 10B, there is data from multiple pings between each of the gateways for use in making the calculations, which can be desirable depending on the calculations being performed. In some embodiments of the invention, once the Quality Metrics have been updated, the system may wait for a delay period to elapse before returning to step 1008 to restart the pinging process. Furthermore, the system may conduct a certain amount of pinging, then wait before calculating the metrics. In other words, the pinging and calculating steps may be on completely different schedules.

In either of the methods described above, the data used to calculate the quality metrics could include only the data recorded since the last calculations, or additional data recorded before the last set of quality metrics were calculated. For instance, pinging could occur every five minutes, and the quality metrics could be calculated every five minutes, but each set of calculations could use data recorded over the last hour.

Figure 11:
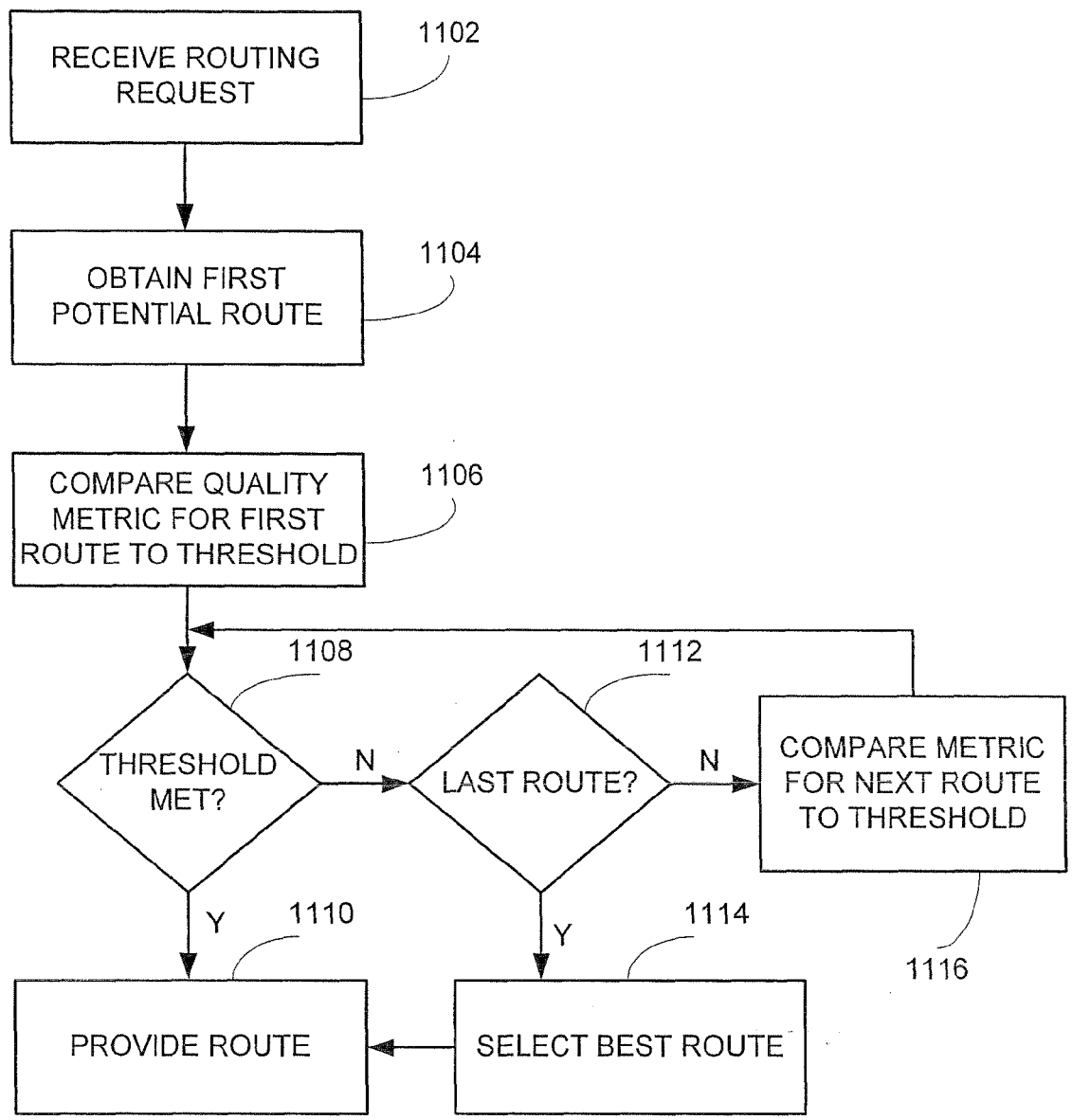
FIG. 11 is a flow diagram of a method for making routing decisions according to a preferred embodiment of the present invention.

FIG. 11 illustrates a method embodying the invention for selecting and providing routing information to a gateway making a routing request. This method would typically be performed by the gatekeeper connected to a gateway, or by the routing controller.

In step 1102, a routing request would be received. In step 1104, the system would obtain a first potential route. This step could involve all of the considerations discussed above relating to the selection of a destination carrier and/or destination gateway and/or an ISP or route between the originating gateway and the destination gateway.

Once the first potential route is determined, in step 1106 the system would look up the quality metrics associated with communications between the originating and destination gateways. This would involve consulting the quality matrix discussed above. One or more quality values in the matrix relating to the first proposed route would be compared to a threshold value in step 1108. If the quality for the first route satisfies the threshold, the method would proceed to step 1110, and the route would be provided to the requesting gateway as a potential route for completion of a call.

If the result of comparison step 1108 indicates that the quality of service metrics for the first route do not satisfy the threshold, then in step 1112 the system would determine if this is the last available route for completing the call. If so, the method would proceed to step 1114, where the best of the available routes would be determined by comparing the quality metrics for each of the routes considered thus far. Then the method would proceed to step 1110, where the best available route would be provided to the requesting gateway.

If the result of step 1112 indicates that there are alternative routes available, the method would proceed to step 1116, where the quality metrics for the next available route would be compared to the threshold value. The method would then proceed to step 1108 to determine if the threshold is satisfied.

A method like the one illustrated in FIG. 11 could be used to identify multiple potential routes for completing a call that all satisfy a basic threshold level of service. The quality metrics associated with each route could then be used to rank the potential routes. Alternatively, the cost associated with each route could be used to rank all routes satisfying the minimum quality of service threshold. In still other alternative embodiments, a combination of cost and quality could be used to rank the potential routes. As explained above, the ranked list of potential routes could then be provided to the requesting gateway.

As also explained above, in providing a route to a gateway, the routing controller may specify either a direct route between the gateways, or a route that uses an interim gateway to relay data packets between an originating and destination gateway. Thus, the step of identifying a potential route in step 1104 could include identifying both direct routes, and indirect routes that pass through one or more interim gateways. When interim gateways are used, the quality metrics for the path between the originating gateway and the interim gateway and the path between the interim gateway and the destination gateway would all have to be considered and somehow combined in the comparison step.

In a system embodying the invention, as shown in FIG. 2, multiple different gateways are all routing calls using routing information provided by the routing controller 200. The routing information stored in the routing controller includes tables that are developed using the methods described above. The routing table indicates the best available routes between any two gateways that are connected to the system. Even when there are multiple routing controllers that are a part of the system, all routing controllers normally have the same routing table information. This means that each time a gateway asks for a route to a destination telephone number, the routing information returned to the gateway will be the same, regardless of which gateway made the routing request. As will be explained below, in prior art systems, the fact that all gateways receive the same routing information can lead to unnecessary signaling and looping of call setup requests.

Figure 12:
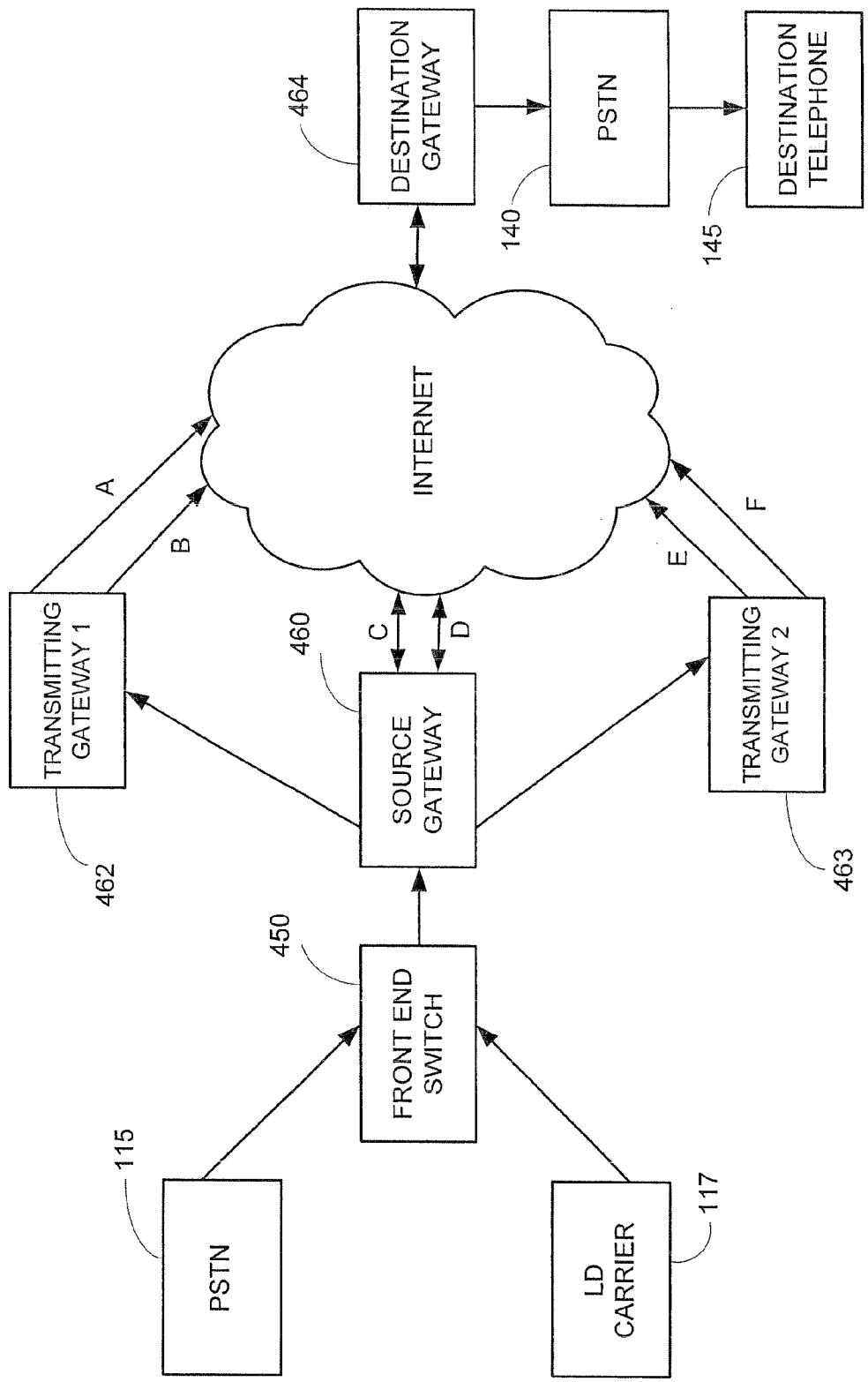
FIG. 12 is a schematic diagram of a system architecture for routing traffic over the Internet, according to a second embodiment of the present invention.

FIG. 12 shows the basic architecture of a system embodying the invention. As shown therein, the PSTN 115 and/or a long distance carrier 117 both deliver calls to a front end switch 450 of the system. The calls arrive at the front end switch 450 as a call set-up request to complete a call to the destination telephone 145. The front end switch 450 or the Source Gateway 460 can then consult a route controller, wherein the route controller determines the most optimal route and a gateway associated with the most optimal route, which can convert the call into digital data packets and place the packets on to the Internet properly addressed to the designation gateway 464. Additionally, a destination gateway may be chosen from a plurality of destination gateways depending on such criteria as, but not limited to, compatibility, dependability, and efficiency. The route controller ranks the routes from the most optimal to least optimal.

Once a route is identified, the call request would be formatted as digital data packets that include header data with routing information. For example the header can include information such as the originating gateway associated with the most optimal route, the destination gateway, and the destination telephone number. The Source Gateway 460 then attempts to complete the call to the destination gateway.

Each of the individual gateways can place data traffic onto the Internet using one or more routes or access points. In the system illustrated in FIG. 12, Source Gateway 460 can place traffic onto the Internet using route C or D. The First Transmitting Gateway 462 can place traffic on the Internet using routes A and B. The Second Transmitting Gateway 463 can place traffic onto the Internet using routes E and F. At any given point in time, one or more of these routes can become inoperative or simply degraded in performance to the point that making a voice call through the route results in poor call quality.

In prior art systems, when the front end switch 450 receives a call request for a call intended for the destination telephone 145 from either the PSTN 115 or the long distance carrier 117, the front end switch would forward the call to one of the gateways so that the call setup procedures could be carried out. For purposes of explanation, assume that the call request is forwarded to Source Gateway 460. The gateway would then make a routing request to the routing controller for information about the address of the destination gateway, and the most preferable route to use to get the data onto the Internet. Again, for purposes of explanation, assume that the routing controller responds with the address of the destination gateway 464, and with the information that the best routes, in preferred order, are routes C, then A, and then E.

With this information, Source Gateway 460 would first try to set the call up to go to the destination gateway 464 via route C. Assume that for whatever reason, route C fails. Source Gateway would then consult the routing information again and determine that the next best route is route A. Thus, Source Gateway would forward the call on to the First Transmitting Gateway 462, which is capable of using route A.

When the First Transmitting Gateway 462 receives the call request, it too will consult the routing controller for routing information. The same information will be returned to the First Transmitting Gateway 462, indicating that the preferred routes are C, then A, then E. With this information, the First Transmitting Gateway 462 believes that route C is the best route, so the First Transmitting Gateway 462 would bounce the call request back to Source Gateway 460, so that the call could be sent through route C. Source Gateway would receive back the same call request it just forwarded on to the First Transmitting Gateway 462. Depending on the intelligence of the Source Gateway, the Source Gateway might immediately send a message to the First Transmitting Gateway 462 indicating that route C has already been attempted and that this route failed. Alternatively, Source Gateway might again try to send the call via route C. Again the route would fail. Either way, the call request would ultimately be bounced back to the First Transmitting Gateway 462 with an indication that the call could not be sent through route C.

When the First Transmitting Gateway 462 gets the call request back from the Source Gateway, it would then consult its routing information and determine that the next route to try is route A. If route A is operable, the call could then be setup between the First Transmitting Gateway 462 and the destination gateway 464 via route A. Although this process eventually results in a successful call setup, there is unnecessary call signaling back and forth between the Source Gateway 460 and the First Transmitting Gateway 462.

Moreover, if the First Transmitting Gateway 462 is unable to set up the call through route A, the First Transmitting Gateway 462 would again consult the routing information it received earlier, and the First Transmitting Gateway 462 would send the call to the Second Transmitting Gateway 463 so that the call can be placed onto the Internet using route E. When the Second Transmitting Gateway 463 receives the call request from the First Transmitting Gateway 462, it too would consult the routing controller and learn that the preferred routes are route C, then route A, then route E. With this information, the Second Transmitting Gateway 463 would forward the call request back to the Source Gateway 460 with instructions to place the call through route C, which would fail again. The Source Gateway 460 would then forward the call back to the Second Transmitting Gateway 463. The Second Transmitting Gateway 463 would then try to complete that call using the First Transmitting Gateway 462 and route A. This too would fail. Finally, the Second Transmitting Gateway 463 would send the call out using route E.

Because each of the gateways are using the same routing information, when one or more routes fail, there can be a large amount of unnecessary looping and message traffic between the gateways as the a call request is passed back and forth between the gateways until the call is finally placed through an operative route. In preferred embodiments of the invention, special routing procedures are followed to reduce or eliminate unnecessary looping.

In preferred embodiments of the invention, if the call attempt fails, the call attempt returns to the Source Gateway 460. The Source Gateway 460 can then query the route controller for a second most optimal route. If the second most optimal route is located through First Transmitting Gateway 462, the route controller attaches a second set of header information identifying the new route to the data packets that comprise the call set up request. The new header information identifies the First Transmitting Gateway 462. The Source Gateway 460 then forwards the second call set-up request to the First Transmitting Gateway 462. The First Transmitting Gateway 462 is configured to strip off the portion of the header data which identifies itself. The First Transmitting Gateway 462 then sends the call setup request on to the Destination Gateway 464. If the second call attempt fails, the data packets are returned to the Source Gateway 460 because the header data identifying the First Transmitting Gateway 462 has been removed. It should be noted that any gateway can be the Source Gateway 460 as long as it is associated with the most optimal route. It should also be noted that any transmitting gateway may be configured to automatically strip off a portion of the header that identifies itself.

To be more specific, if the route controller determined that route C is the most optimal route, the translated header information inserted onto the data packets containing the call setup request would include an identification of the Source Gateway 460, because that is where the route is located, plus the destination gateway 464, plus the destination telephone number. The Source Gateway 460 then attempts the call setup by sending the data packets to the Destination Gateway 464. If the call attempt is successful, the call connection is completed. However, if the call attempt fails, for any reason, it is returned to the Source Gateway 460.

The gatekeeper then queries the route controller for a second most optimal route. For example, in FIG. 12, the second most optimal route may be route A, which is located through the First Transmitting Gateway 462. The Source Gateway 460 would then insert new header information, consisting of the identification of the First Transmitting Gateway 462 in front of the existing header information. The Source Gateway 460 then forwards the call set-up request, with the new header information, to the First Transmitting Gateway 462. The First Transmitting Gateway 462 reads the header information and discovers that the first part of the header information is its own address. The First Transmitting Gateway 462 will then strip off its own identification portion of the header. The First Transmitting Gateway 462 then attempts a call setup to the destination gateway 464. If the second call attempt fails, the destination gateway 464 returns the call attempt to the Source Gateway 460, because the remaining portion of the header only identifies the Source Gateway 460. Thus, rather than bouncing the call attempt back to the First Transmitting Gateway 462, the failed call attempt would simply return to the Source Gateway 460, which tracks route failure and remaining optimal route information. This method can eliminate or reduce unnecessary looping.

In a second embodiment, each of the gateways will know which routes are associated with each gateway. Alternatively, this information may be provided by the routing controller as needed. This means that the First Transmitting Gateway 462 would know that the Source Gateway 460 uses routes C and D, and that the Second Transmitting Gateway 463 uses routes E and F. The gateways can then use this information to reduce or eliminate unnecessary looping.

For instance, using the same example as described above, when a call request comes in to place a call to destination telephone 145, the Source Gateway 460 would first try to send the call via route C. When that route fails, the Source Gateway 460 would send the call request to the First Transmitting Gateway 462 so that the First Transmitting Gateway 462 could send the call via route A. In the prior art system, the First Transmitting Gateway 462 would have bounced the call request back to the Source Gateway 460 because the First Transmitting Gateway 462 would believe that route C is the best way to route that call. But in a system embodying the invention, the First Transmitting Gateway 462 would know that the Source Gateway 460 uses route C. With this knowledge, and knowing that the call request came from the Source Gateway 460, the First Transmitting Gateway 462 would conclude that the Source Gateway 460 must have already tried to use route C, and that route C must have failed. Thus, rather than bouncing the call request back to the Source Gateway 460, the First Transmitting Gateway 462 would simply try the next best route, which would be route A. Similar logic can be used at each of the other gateways to eliminate unnecessary looping.

In another preferred embodiment, special addressing information can be included in the messages passing back and forth between the gateways. For instance, and again with reference to the same example described above, assume that the Source Gateway 460 first gets a call request to complete a call to destination telephone 145. The Source Gateway 460 would try to send the call via route C, and route C would fail. At this point, the Source Gateway 460 would know that the next best route is route A. In this embodiment, before sending the call request on to the First Transmitting Gateway 462, the Source Gateway 460 could encode a special addressing message into the call request. The special addressing message would inform the First Transmitting Gateway 462 that the call request should be sent via a specific route. In the example, the Source Gateway 460 would include addressing codes that indicate that the call request should be sent via route A, since that is the next best route.

When the First Transmitting Gateway 462 receives the call request, it would read the special routing information and immediately know that the call should be sent via route A. If route A is operable, the call will immediately be sent out using route A. If route A is not available, the First Transmitting Gateway 462 would consult the routing controller and determine that the next route to try is route E. The First Transmitting Gateway 462 would then send the call request on to the Second Transmitting Gateway 463 with special addressing information that tells the Second Transmitting Gateway 463 to immediately try to place the call using route E. In this manner, unnecessary looping can be eliminated.

As explained earlier, when a system embodying the invention receives a call request, the originating gateway obtains routing information for the call that indicates how to best route the call. This routing information is typically obtained from a central routing table which is created by the system.

The complexity of the routing table will depend on the complexity of the system. In the case of a simple system where all calls are originating from the same location, and where all calls are delivered onto the Internet via the same Internet Service Provider, the routing table would probably only list, for each destination served by the system, the destination gateways capable of completing calls to that destination. The set of destination gateways associated with each destination would be ranked in a preferred order. Thus, when the system tries to complete a call to particular destination, the system would obtain the ranked list of destination gateways, and the system would first try to complete the call using the first destination gateway on the list. If the call cannot be completed using the first destination gateway, the system would try to complete the call using the second destination gateway on the list. This process would be repeated until the call is successfully completed, or until there are no more destination gateways to use.

FIG. 13A shows a routing table that could be used by this type of simple system. As shown therein, the routing table lists various destinations on the left side. For each destination, the routing table lists a series of destination gateways that could be used to complete calls to that corresponding destination. The destination gateways are provided in a particular order. When the originating gateway tries to complete a call, it will attempt to use the destination gateways in this order. Thus, for example, if the system is trying to route a call into Spain, the system will first try to complete the call using destination gateway 37. If the call cannot be completed using destination gateway 37, the system will next try to complete the call using destination gateway 71. If the call still cannot be completed, the system will attempt to complete the call through destination gateway 40.

In this simple system, an exception routing table could be created for each client to take into account client preferences for using certain destination gateways. The exception routing table for a client would list, for particular destinations, the preferred destination gateways to be used. Typically, a client would only have a small number of preferred destination gateways. Thus, the exception routing table for a client would be much smaller that the general routing table in use by the system.

FIG. 13B shows an example of an exception routing table for this simple system. In this table, Client 1's preferred destination gateways are listed. In this instance, Client 1 only has preferences for destination gateways in Spain and Italy. In Spain, Client 1 would prefer to use destination gateway 40 before using destination gateways 37 and 71. Also, in Italy Client 1 would prefer to use destination gateway 51. If calls cannot be completed through the preferred destination gateway, then the remaining destination gateways are listed in the same order. Of course, a client could have preferences that would result in listing the destination gateways in any particular order as before. In addition, in some instances, the client might prefer that some available destination gateways not be used at all. Thus, a client's exception routing table may not contain all of the technically available destination gateways for a particular destination.

FIG. 13C shows an example of an exception routing table for Client 2. In this instance, Client 2 only has preferences for destination gateways in France. And, as shown in FIG. 13C, Client 2 prefers to use destination gateway 14 before using any of the other available destination gateways. As also reflected in this exception routing table, Client 2 prefers not to use destination gateway 31 at all. Thus, even though this destination gateway would be available for routing calls to France, as reflected in the general routing table shown in FIG. 13A, calls for Client 2 will not make use of destination gateway 31.

Figure 14:
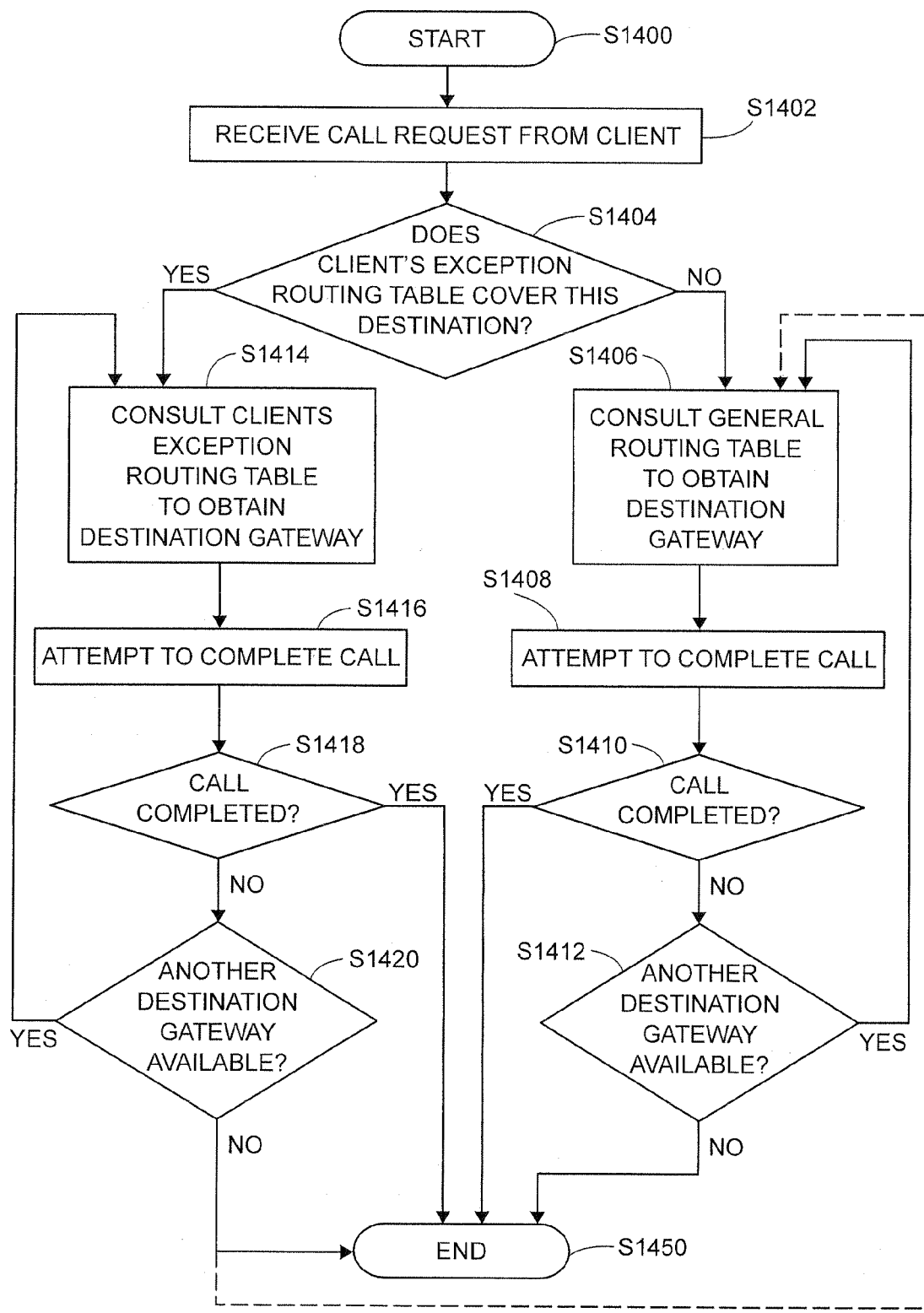
FIG. 14 illustrates a method embodying the invention for routing telephone calls over the Internet.

A method of routing calls using exception routing tables is shown in the flow diagram in FIG. 14. This method illustrates how a simple system for routing telephone calls over the Internet can use exception routing tables to take customer preferences for particular destination gateways into account.

The method begins in step S1400, and proceeds to step S1420, where a call request is received for a client. Then, in step S1404, the method determines if there is an exception routing table for this client that covers the destination for the call. In some instances, the client may have no exception routing table whatsoever. In other instances, the client may have one or more exception routing tables, but the exception routing table(s) may not cover this destination. In both of these instances, the method would proceed to step S1406, where a general routing table for the system would be used to obtain the identification of a first destination gateway that is potentially capable of completing the call.

In step S1408, the system would attempt to complete the call using the first destination gateway obtained in step S1406. In step S1410, the method would determine if the call had been successfully completed. If so, the method would proceed to step S1450, where the method would end. If the call is not successfully completed using the first destination gateway, the method would instead proceed to step S1412. There the method would determine if another destination gateway is listed in the general routing table as being potentially capable of completing the call. If not, the method would proceed to step S1450, where the method would end. If there is another destination gateway that is potentially capable of completing the call, the method would go back to step S1406, and the system would obtain the identification of another destination gateway, and another attempt would be made to complete the call in step S1418. The method would proceed in this fashion until the call is completed through a destination gateway, or until all available destination gateways have been tried.

If the result of step S1404 was that the client has one or more exception routing tables covering this destination, then the method would proceed to step S1414, where the client's exception routing table(s) would be consulted to determine the identity of the client's first preferred destination gateway. If the client has multiple exception routing tables, it might be appropriate to use only one of these table. Or, the system might know to consult the client's exception routing tables in a particular order.

Regardless of how the system picks a exception routing table for the client, in step S1416, the system would try to complete the call using the client's first preferred destination gateway from the selected routing table. Next, in step S1418, the method would determine if the call had been successfully completed. If so, the method would proceed to step S1450, where the method would end. If the call is not successfully completed, the method would go to step S1420, where the system would determine if another destination gateway capable of completing the call is listed in the client's exception routing table. Or, if all the entries in a first exception routing table have been exhausted, the system might turn to a second exception routing table for the client to see if the second exception routing table has more routing information for the destination telephone number. If so, the method would go back to step S1414 where the identity of the client's next preferred destination gateway would be determined. The method would then proceed to try to complete the call through this next preferred destination gateway. The method would proceed in this fashion until the call is completed, or until all preferred destination gateways listed in the client's exception routing table(s) have been tried.

In preferred embodiments, if none of the destination gateways listed in the client's exception routing tables have been able to complete the call, then the method will end at step S1450. In alternate embodiments, if none of the destination gateways listed in the client's exception routing tables have been able to complete the call, then the method will proceed from step S1420 to step S1406, and the system will try to complete the call using the standard routing table. In this alternate embodiment, either the call will be completed using this information, or the method would ultimately end without completing the call.

As explained above, a simple VoIP system and method using the general routing table and the exception routing tables shown in FIGS. 13A-13C, and operating according to the method shown in FIG. 14, allows client preferences for using certain destination gateways to be accommodated. In addition, because the exception routing tables only contain the client's preferences, and they do not cover all possible destinations, the exception routing tables can remain small. This conserves system resources in creating and maintaining the exception routing tables.

Those of ordinary skill in the art will appreciate that in a real world VoIP system, the general routing table could include entries for thousands and thousands of potential destinations. In contrast, a client might only have preferences about the use of destination gateways for only a few destinations. Thus, the system resource savings in generating and maintaining small exception routing tables for each client, as opposed to a full routing table for each client that includes the client's exceptions, is much more significant that it would appear from viewing the examples shown in FIGS. 13A-13C. For illustration purposes, the general routing table shown in FIG. 13A is much smaller than a real world general routing table.

The foregoing description of a system and method for using exception routing tables applied only to a simple system where calls all originate from the same location, where the calls are all placed onto the Internet using the same ISP, and wherein the routing tables only list the destination gateways used to reach particular destinations. Most VoIP systems, however, are much more complex.

In a typical VoIP system, calls could originate from multiple different locations. For instance, as shown in FIG. 8, gateways A, B, C and D could all be located in different countries, and each gateway could act as an originating gateway. In addition, Gateway B can communicate with Gateways A and D through the Internet, but Gateway B can only communicate with Gateway C through a separate external connection. Thus, the general routing table for this type of system might be configured to reflect more than just the destination gateways associated with each destination. The routing table might also reflect how the connection to the destination gateway is to be established. In other words, the routing table may include an indication that the data is to be sent through the Internet, or through a separate direct external connection.

Moreover, as explained above, in some instances the best quality path between an originating gateway and an ultimate destination gateway may not be directly from the originating gateway to the destination gateway. Instead, the best call quality might be obtained by sending data packets containing the call through an interim gateway. For instance, and with reference to FIG. 8, the best call quality for a call starting at Gateway A and ending at Gateway C might be obtained by routing the data traffic for the call through Gateway B. In this instance, the routing table may include information that instructs originating Gateway A to route the call through Gateway B and then on to Gateway C. Here again, the routing information might also indicate that the data should be sent through the Internet when passing from Gateway A to Gateway B, and then through the external direct connection when passing from Gateway B to Gateway C.

In addition, each originating gateway could deliver call traffic onto the Internet via multiple different ISPs. For example, as shown in FIG. 12, Gateway 462 can deliver data onto the Internet either through path A or through path B. Gateway 460 can deliver data onto the Internet through path C or path D. Likewise, Gateway 463 could deliver data onto the Internet through path E or path F. As explained above, some paths onto the Internet could be better than others in terms of call quality or cost. Also, for the same originating gateway, one path might be better at one time of day/day of the week, and a different path might be better at a different time of day/day of the week. Because each originating gateway could deliver data traffic onto the Internet via multiple paths, or ISPs, this information might also be included in the general routing tables. Further, the routing table might vary the preferred path onto the Internet based on time varying conditions.

Routing tables are generally organized based on the called telephone number. In other words, the system uses the called telephone number to determine the routing information to use to attempt to complete the call. And this means that the table entries must correspond to the dialed telephone numbers.

Each entry will have a certain number of digits of the called telephone number. And the entries in the routing tables may have different numbers of digits. To explain this in greater detail, assume that the telephone numbers within a country all include 10 digits. Usually, the first two or three digits will correspond to a particular region, and as you progress to the fourth, fifth and additional digits, this will progressively narrow the geographical region corresponding to the dialed telephone number.

Individual destination gateways can serve only a small geographical region, or they might serve a large geographical region. Thus, an entry in a routing table that lists a particular destination gateway may be capable of serving all telephone numbers having the first three digits 123. Also, a different entry in the routing table could list a different destination gateway that is only capable of serving telephone numbers having the first five digits 123-45.

The fact that individual destination gateways have these restraints, results in the individual entries in the routing tables having different degrees of granularity, in terms of the dialed or destination telephone numbers. There might be a first entry for destination telephone numbers beginning with 123 that lists six different potential destination gateways, ordered according to cost or other factors. But there might also be another entry in the same routing table for destination telephone numbers beginning with 12345. This second entry will likely include a smaller number of destination gateways that can complete the call to the called party.

An example of a routing table that is organized according to the dial patterns is shown in FIG. 15. The dial patterns for the different entries are listed on the left side of the table, and the gateways capable of completing calls to each of the dial patterns are listed next to each dial pattern. As can be seen, the individual entries can have dial patterns of differing lengths.

In preferred embodiments, the routing tables are constantly edited and adjusted so that each table will only include entries with a greater number of dialed digits if the routing information corresponding to those greater number of dialed digits will result in the call being completed for a lower cost than if the call had been routing using the routing information from an entry with a lesser number of digits. For instance, assume that a routing table has a first line that provides routing information for telephone calls that begin with 123, and a second line that provides routing information for telephone calls that begin with 1234. In this instance, if the routing information for second line (for numbers beginning with 1234) would result in the telephone call being completed for the same or a greater cost as the routing information provided in the first line, then the system deems the second line as unnecessary, and the second line is deleted. This helps to keep the routing tables as small as possible, which conserves system resources, and also speeds up the process of searching through the tables.

On the other hand, if the second line contains routing information that can be used to route a telephone call to a number beginning with 1234 for a lower cost than the routing information contained in the first line (for telephone numbers beginning with 123), the second line will be preserved in the routing table. This helps to ensure that calls are completed for the lowest possible cost, which improves profitability. However, to realize the benefit of the lower routing costs, the system must know that when a call setup request comes in for a destination telephone number beginning with 1234, the system should use the routing information in the second line (with the greater number of matching digits), as opposed to the routing information in the first line (having a lesser number of matching digits). Thus, the system is configured to use a "best match" approach to selecting routing information from the routing tables.

Under the best match approach, the system will select the line of a routing table that has the greatest number of digits matching the dialed telephone number. In other words, when faced with the option of picking between two lines of a routing table that both contain information that could be used to route the call, if one line has a larger number of matching digits than then other, the system will first try to use the entry with the larger number of digits. And, as explained above, this has the potential to complete the call for a lower cost, because the entry with the larger number of digits would not even be in the routing table unless it provided routing information that could be used to complete the call for a lower cost. If the routing information in that line does not result in the call being connected, then the system would use the routing information from the line with the lesser number of digits as a fall back.

This leads us to a discussion of two alternative ways of utilizing the clients' exception routing tables. In one alternative, which is called the "best match" approach, when a call setup request is received, the system will examine all of the client's exception routing tables, and the standard routing table. From all these tables, the system would first try to route the call with the routing information from the entry (from all the tables) having the best match to the destination telephone number. If that entry is located in one of the client's exception routing tables, that information would be used to attempt to route the call. If the best match is located in the standard routing table, that information would be used to attempt to route the call. And if the routing information from the best match entry does not result in the call being completed, the system would then turn to the next-best matching table entry, regardless of where it is located.

If the system finds that there are entries in both the standard routing table and in one of the client's exception routing tables that have the same number of matching digits, then the system would first attempt to use the entry in the client's exception routing table. If that routing information does not result in the call be completed, the system would then try the routing information contained in the standard routing table.

In situations where a client has multiple routing tables, the routing tables will have sequence numbers. And when a call setup request comes in, and the system determines that two of the client's exception routing tables have entries with the same number of matching digits, the system will consult the exception routing tables according to their sequence numbers.

Figure 16:
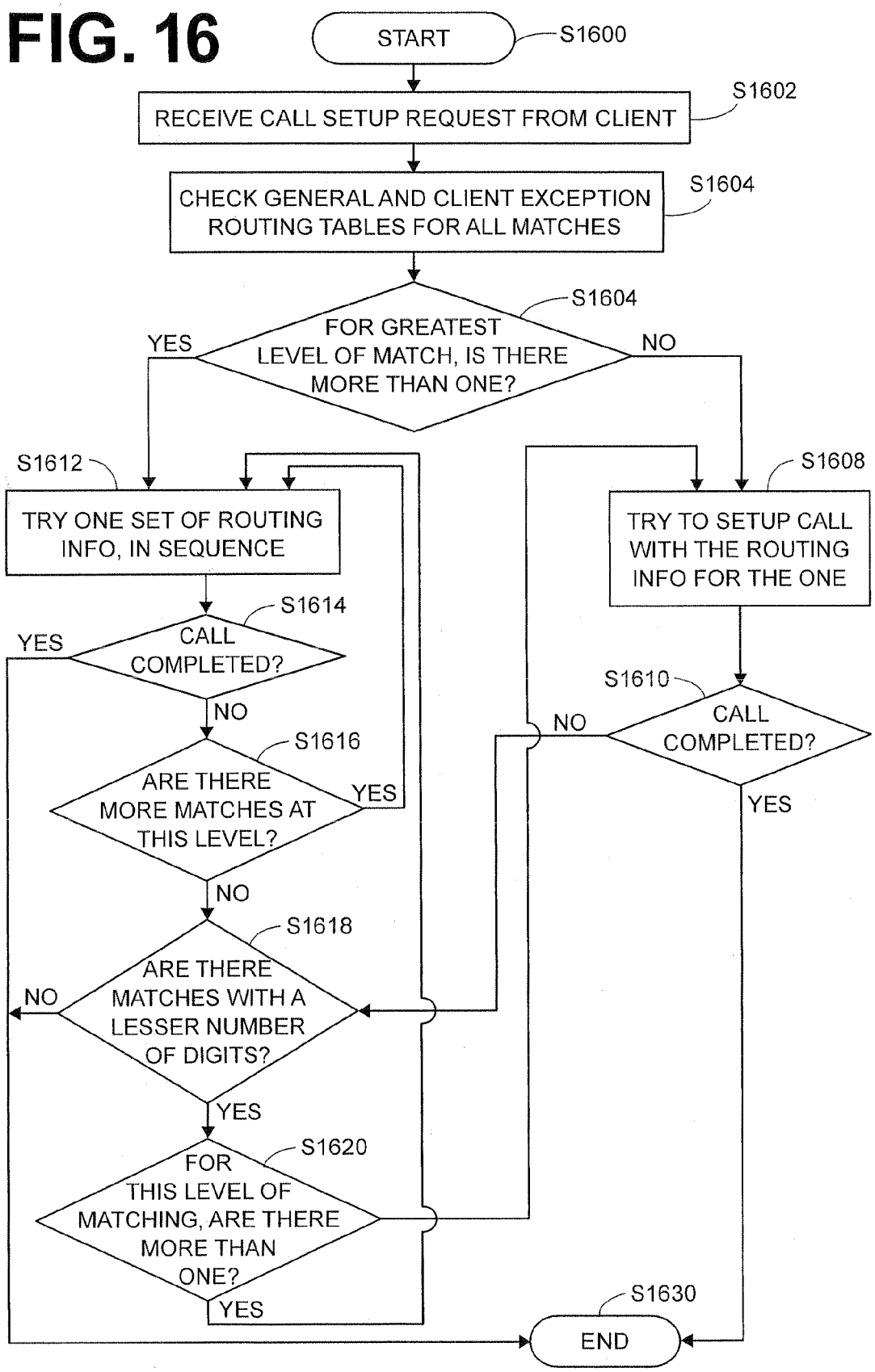
FIG. 16 illustrates steps of a best match approach to routing a telephone call over the Internet.

FIG. 16 illustrates steps of a method for routing telephone calls using the "best match" approach. This method starts at step S1600, and in step S1602, the system receives a call setup request from a particular client. In step S1604, the system will search through all of the client's exception routing tables, and through the standard routing table to find all the entries that match the destination telephone number.

In step S1606, the system will determine if there are more than one entry having the largest number of matching digits. If there is only one entry in one table having the largest number of matching digits, the method proceeds to step S1608, where the system will try to complete the call with the routing information contained in that one entry. In step S1610, a check will be preformed to determine if the call was completed. If so, the method ends in step S1630.

If the system was unable to complete the call using the routing information from the one table entry having the largest number of matching digits, the method will move to step S1618, where a check is performed to determine if there are any matching entries having a lesser number of matching digits. If not, this means that the system has been unable to complete the call, and the method would end at step S1630. The system would send a message back to the client indicating that the call could not be completed.

If there are entries having a lesser number of matching digits, the system will move to step S1612. Note, if the system had determined in step S1606 that there was more than one entry, among all the tables, with the same number of matching digits, the method would also have progressed to step S1612. In this step, the system will look at all of the routing tables having entries with the same number of matching digits, and it will select the first table in sequence, and use the routing information from that table to try to complete the call. In this context, selecting the first table in sequence could have several different meanings. If there is an entry in the standard routing table, and an entry in one of the client's exception routing tables, the exception routing table would first be used to try to complete the call. If there are multiple exception routing tables having a matching entry, the exception routing tables would have already been assigned sequence numbers, and the system would use the routing table having the lowest sequence number (or the highest sequence number, depending on the sequencing scheme).

After trying to complete the call using the routing information in the first table in sequence, a check would be performed in step S1614 to determine if the call had been completed. If so, the method would end at step S1630. If not, in step S1616, the system would check to determine if there are other entries in other tables having this same number of matching digits. If so, the system would return to step S1612, where the information from the next table in the sequence order would be used to try to complete the call.

If there are no more entries having this same level of matching digits, the system would proceed to step S1618, and a check would be performed to determine if there are entries with a lesser number of matching digits. If not, the system would end at step S1630. If there are entries with a lesser number of digits, the method proceeds to step S1620, where a check is performed to determine if these is more than one entry having this lesser number of matching digits. If the check indicates that there is only one entry, the method proceeds to step S1608. If there are multiple entries having this lesser number of matching digits, the method proceeds to step S1612.

It is also possible for the system to use a "non-best match" approach. In this approach, when a call setup request comes in, the system would first check to see if there are any entries in any of the client's exception routing tables that could be used to route the call. And if the client has more than one exception routing table, the exception routing tables are consulted in the order of their assigned sequence numbers. Thus, if the first exception routing table in the sequence has an entry that corresponds to the dialed telephone number, the system will first try to use that information to complete the call. If that routing information fails to complete the call, the system would then consult the next client exception routing table in the sequence to look for an entry that matches the dialed telephone number. If an entry is found in that next exception routing table, that routing information would be used to try to complete the call.

Note, when the system is operating in the non-best match approach, the system might use routing information for a table entry in a first exception routing table that has a smaller number of matching digits before using routing information from an entry in a second exception routing table that has a larger number of matching digits (a better match). The number of matching digits is ignored, and the exception routing tables are simply consulted according to their sequence numbers. Of course, if there are two entries in a single exception routing table that have different numbers of digits, both of which match the dialed telephone number, the system will use the better matching entry in the table first, before attempting to use the entry with a lesser number of digits.

If none of the client's exception routing tables have entries that match the destination telephone number, or if none of the matching entries result in the telephone call being completed, then the system will turn to the standard routing table.

Figure 17:
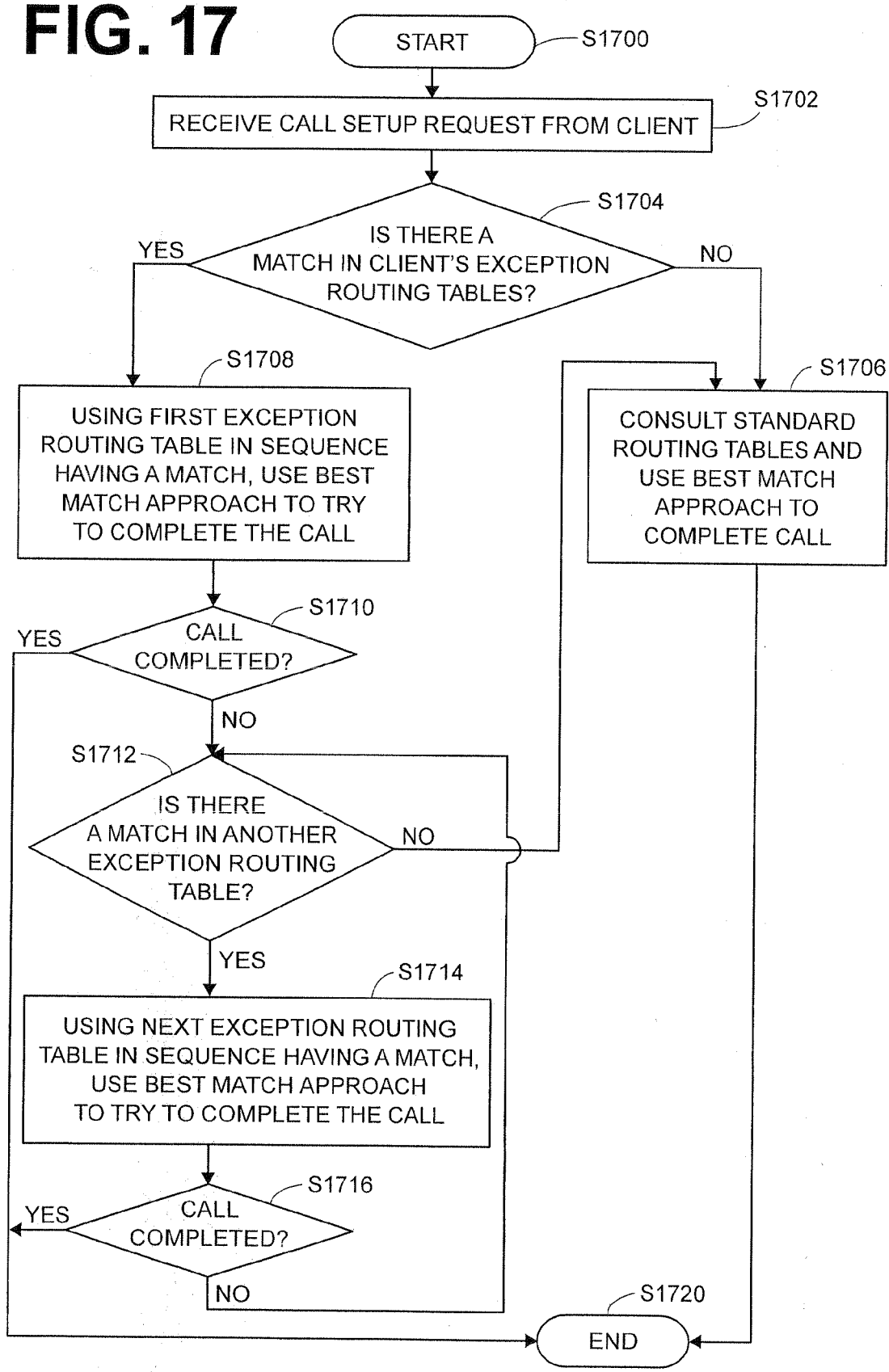
FIG. 17 illustrates steps of a non-best match approach to routing a telephone call over the Internet.

A diagram of a method that follows this non-best match approach is provided in FIG. 17. As shown therein, the method begins with step S1700. At step S1702, a call setup request is received from a client. In step S1704, a check is performed to determine if there is a match for the destination telephone number in any of the client's exception routing tables.

If there is no match for the destination telephone number in any of the client's exception routing tables, in step S1706 the standard routing table is used to route the call. The method would then end at step S1720.

If a match is found in one or more of the client's exception routing tables, in step S1708, the first exception routing table in sequence having a match would be used to try to route the call. The sequence referred to here would be a predetermined sequence that has been established for this client. For instance, if this client has three exception routing tables, each exception routing table would be assigned a sequence number. And when this non-best match approach is being followed, the system would turn to the exception routing tables, one by one, according to their sequence numbers.

In step S1708, the first exception routing table (according to the sequence numbers) for this client having a match to the destination telephone number would be used to try to route the call. And if there are multiple entries in this routing table that match the destination telephone number, the entries would be used according to the best match approach, where matching entries with a greater number of matching digits are used before matching entries with a lesser number of matching digits.

In step S1710, a check would be performed to determine if the call had been successfully completed. If so, the method would end in step S1720. If not, the method would proceed to step S1712 where a check would be performed to determine if there is a match in another one of the client's exception routing tables. If there are no more matching entries in other ones of the client's exception routing tables, then the method would proceed to step S1706, where the system would use the standard routing table to try to complete the call.

If the check in step S1712 indicates that there is another exception routing table for this client having a matching entry, then the method proceeds to step S1714 there the next exception routing table having a match, according to the assigned sequence numbers, is used to try to complete the call. Here again, if there are multiple matching entries in this exception routing table, the best match approach would be used in trying the different entires.

In step S1716, a check would be performed to determine if the call had been completed. If so, the method would end in step S1720. If not, the method would loop back to step S1712, where another check would be performed to determine if other exception routing tables for this client have matching entries.

The non-best match approach explained above will result in the system consulting the client's exception routing tables in a specified order to try to complete the call. And if the call cannot be completed using the client's exception routing tables, then the standard routing table will be used.

As noted above, a single client can have multiple exception routing tables. And the multiple different exception routing tables may each be devoted to a different purpose. For instance, a single client could have a first exception routing table that is to be used for calls that require a high degree of call quality, and a second exception routing table that is to be used for calls that must be completed for the lowest available cost. When a call setup request is delivered from the client to the VOIP system, the call setup request would include information indicating that the call requires high call quality routing or least cost routing. The system would then proceed as explained above with either a best match approach, or a non-best match approach. But when consulting the client's exception routing tables, only the exception routing tables corresponding to the type of routing specified in the call setup request (best quality or least cost) would be used.

In addition to the fact that a single client can have multiple exception routing tables, it is also possible for multiple client to share the same routing table. Moreover, even the general routing tables in use by the system may include a first general routing table for calls requiring a high call quality and a second general routing table for calls requiring least cost routing.

In the examples given above, the exception routing tables for a particular client were for high call quality calls and for least cost routing. Other types of exception routing tables could also be developed for various clients. For instance, the client might have exception routing tables for different times of day or for different days of the week. Further, different exception routing tables could be consulted depending on where the calls is originating, and/or the destination to which the call is to be completed. Various other types of exception routing tables could also be developed to account for various other factors. Here again, the system might know to consult a client's exception routing tables in a particular order to obtain routing information for a call.

For all the above reasons, a real world implementation of a VoIP system embodying the invention would probably have at least one general routing table, and possibly multiple general routing tables. Such a system could also have at least one exception routing table for each client, and possibly multiple exception routing tables for each client. And each of those routing tables could be far more complex than the relatively simple routing tables shown in FIGS. 13A-13C and 15.

Because the originating and destination gateways can be located at multiple locations, the more complex routing tables would probably be configured in a matrix form, where the originating gateways are listed on one axis, where the destinations are located on another axis, and wherein routing information is located at the intersections. Here again, the destination information would typically be expressed in the form of dial patterns. The more digits in a dial pattern, the more specific the location served by that dial pattern.

One such complex general routing table is shown in FIG. 18. As shown in FIG. 18, the originating gateways are listed on the vertical axis, and the destination locations (dial patterns) are located along the horizontal axis. At the intersection of most rows and columns, routing information is provided. The routing information is shown in the table as a generalized $R_x$. This routing information, $R_x$, could include information about the identity of destination gateways, the preferred ISPs that the originating gateway is to use to deliver data traffic onto the Internet, and possibly also information about how the data is to be transmitted (via the Internet, or thorough a separate data connection). In addition, each set of routing information $R_x$ could include multiple sets of routing information, provided in a ranked order, so that the originating gateway can make multiple attempts to place the call.

In the table shown in FIG. 18, some intersections of originating gateways and destination locations are blank. This reflects the fact that the originating gateway is already in that location. For instance, originating gateway A is in location 1. Likewise both originating gateway D and originating gateway E are in location 3.

The exception routing tables for this more complex system could take many different forms. For instance, if a client prefers to use specific destination gateways, the exception routing table could take the form shown in FIG. 19. In this exception routing table, the client has preferences about the use of specific destination gateways sited in locations 1 and 5.

Thus, the exception routing table only needs to include routing information for these two locations.

FIG. 20 shows an alternate version of a client's exception routing table. In this instance, the client would have a preference for the use of certain Internet Service Providers. In the exception routing table shown in FIG. 18, routing information is only given for originating gateways B, F and G. This is because only originating gateways B, F and G are capable of delivering data onto the Internet using the client's preferred ISP. All the other originating gateways in the system necessarily use other ISPs. For this reason, the exception routing table only needs three rows of routing information.

Despite the increased complexity of the general routing table shown in FIG. 18, and the exception routing tables shown in FIGS. 19 and 20, this more complex system can still operate using the same basic method illustrated in FIG. 14. Once difference, however, would be that in steps S1406 and S1414, the system will be consulting a general routing table or an exception routing table to get routing information that will probably include more than just the identity of destination gateways. Also, in steps S1412 and S1420, the system would be checking to see if alternate routing information is available when one route fails. And the alternate routing information would probably include more than just the identity of the destination gateway.

Another difference for the method shown in FIG. 14 is that if a client has multiple routing tables, the step S1404 might include checking multiple exception routing tables for the client, in a particular order, or based on information received as part of the call setup request, to determine if there is an entry in one of the client's exception routing tables corresponding to the destination telephone number.

As explained above, a system and method embodying the invention allows the VoIP system to take customer preferences into account, without creating and maintaining completely separate routing tables for each client. Instead, one or more much smaller exception routing tables are created for each client. Then, when a call request is received from that client the system first checks the client's exception routing tables to see if routing information is available for the requested call. If so, the routing information in the client's exception routing table is used in lieu of the routing information in the general routing tables. If no routing information for the requested call is in the client's exception routing table, the system simply uses the general routing table information to complete the call.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for obtaining routing information for a telephone call to be placed through a Voice Over Internet Protocol (VOIP) system, comprising:
    receiving information about a destination for a call that is to be placed, and an identity of a client requesting that the call be placed;
    determining if routing information for the call exists in an exception routing table for the client requesting that the call be placed, the exception routing table indicating one or more destination gateways that could be used by the VOIP system to complete the call;
    attempting to complete the call using the routing information contained in the client's exception routing table, if routing information for the call exists in the client's exception routing table; and
    attempting to complete the call using routing information from a general routing table if no routing information for the call exists in the client's exception routing table, the general routing table also indicating one or more destination gateways that could be used by the VOIP system to complete the call.

2. The method of claim 1, wherein the receiving step further comprises receiving information about the identity of an originating gateway that will be used to complete the call.

3. The method of claim 1, wherein the attempting steps comprise attempting to complete the call using the identity of a destination gateway contained in the routing information.

4. The method of claim 3, wherein the attempting steps comprise attempting to complete the call using an Internet Service Provider contained in the routing information.

5. The method of claim 1, wherein the attempting steps comprise attempting to complete the call using an Internet Service Provider contained in the routing information.

6. The method of claim 1, wherein the determining step comprises consulting multiple exception routing tables for the client.

7. The method of claim 6, wherein the determining step further comprises consulting the multiple exception routing tables for the client in a particular order.

8. The method of claim 7, wherein the multiple exception routing tables are consulted in a particular order that is based on information received about the call.

9. A system for providing routing information for a telephone call to be placed through a Voice Over Internet Protocol (VoIP) system, comprising:
    means for receiving information about a destination for a call that is to be placed, and an identity of a client requesting that the call be placed;
    means for determining if routing information for the call exists in an exception routing table for the client requesting that the call be placed, the exception routing table indicating one or more destination gateways that could be used by the VOIP system to complete the call;
    means for attempting to complete the call using the routing information contained in the client's exception routing table, if routing information for the call exists in the client's exception routing table; and
    means for attempting to complete the call using routing information from a general routing table if no routing information for the call exists in the client's exception routing table, the general routing table also indicating one or more destination gateways that could be used by the VOIP system to complete the call.

10. The system of claim 9, wherein the receiving means is also configured to receive information about the identity of an originating gateway that will be used to complete the call.

11. The system of claim 9, wherein both attempting means attempt to complete the call using the identity of a destination gateway contained in the routing information.

12. The system of claim 11, wherein both attempting means attempt to complete the call using an Internet Service Provider contained in the routing information.

13. The system of claim 9, wherein both attempting means attempt to complete the call using an Internet Service Provider contained in the routing information.

14. A method for storing routing information that is to be used to route telephone calls in a Voice Over Internet Protocol (VoIP) system, comprising:
- storing routing information used to route calls between a plurality of originating gateways and a plurality of destination gateways in a general routing table, the general routing table indicating one or more destination gateways that can be used to complete calls; and
- storing routing information used to route calls in at least one client exception routing table, wherein each at least one client exception routing table only contains routing information relating to specific client routing preferences, and wherein each at least one client exception routing table also indicates one or more destination gateways that can be used to complete calls.

15. The method of claim 14, wherein the step of storing routing information used to route calls in at least one client exception routing table comprises storing routing information that instructs the VoIP system to first attempt to use client preferred destination gateways to complete calls for that client.

16. The method of claim 15, wherein the step of storing routing information used to route calls in at least one client exception routing table further comprises storing routing information that instructs the VoIP system to first attempt to use-client preferred Internet Service Providers to complete calls for that client.

17. The method of claim 14, wherein the step of storing routing information used to route calls in at least one client exception routing table comprises storing routing information that instructs the VoIP system to first attempt to use client preferred Internet Service Providers to complete calls for that client.

18. The method of claim 14, wherein the step of storing routing information used to route calls in at least one client exception routing table comprises storing routing information in multiple exception routing tables for a single client, wherein each exception routing table for that client contains routing information relating to different specific type of routing preference for that client.

19. A system for storing routing information that is to be used to route telephone calls in a Voice Over Internet Protocol (VoIP) system, comprising:
- means for storing routing information used to route calls between a plurality of originating gateways and a plurality of destination gateways in a general routing table, the general routing table indicating one or more destination gateways that can be used to complete calls; and
- means for storing routing information used to route calls in at least one client exception routing table, wherein each at least one client exception routing table only contains routing information relating to specific client routing preferences, and wherein each at least one client exception routing table also indicates one of more destination gateways that can be used to complete calls.

20. A Voice Over Internet Protocol (VoIP) system for routing telephone calls over the Internet, comprising:
- a plurality of originating gateways that are configured to receive call setup requests from clients and that are configured to deliver data packets onto the Internet to complete a call to a called party; and
- a routing engine that is configured to provide routing information to the plurality of originating gateways to instruct the originating gateways about how to address and place data packets onto the Internet, wherein the routing engine comprises:
  - a general routing table containing routing information, the general routing table indicates one or more destination gateways that can be used to complete calls; and
  - at least one client exception routing table containing routing information that reflects client-specific routing preferences, the at least one client exception routing table also indicates one or more destination gateways that can be used to complete calls.

21. The system of claim 20, wherein the at least one client exception routing table contains information about preferred destination gateways that a client would prefer to use to complete calls.

22. The system of claim 20, wherein the at least one client exception routing table contains information about preferred Internet Service Providers that a client would prefer to use to complete calls.

* * * * *